United States Patent [19]
Ying et al.

[11] Patent Number: 6,028,025
[45] Date of Patent: Feb. 22, 2000

[54] METALLOPORPHYRIN OXIDATION CATALYST COVALENTLY COUPLED TO AN INORGANIC SURFACE AND METHOD MAKING SAME

[75] Inventors: Jackie Y. Ying, Winchester; Lei Zhang, Cambridge, both of Mass.; Tao Sun, Midland, Mich.

[73] Assignee: Massachusetts Institute of Technology, Cambridge, Mass.

[21] Appl. No.: 08/734,170

[22] Filed: Oct. 21, 1996

[51] Int. Cl.$^7$ ...................................................... B01J 31/22
[52] U.S. Cl. ........................ 502/171; 502/150; 502/167; 502/300; 502/305; 502/324; 502/325
[58] Field of Search ..................... 502/159, 163, 502/402, 150, 167, 171, 509, 514, 300, 305, 324, 325; 208/206; 540/145

[56] References Cited

U.S. PATENT DOCUMENTS

| | | | |
|---|---|---|---|
| 2,966,453 | 2/1960 | Gleim | 208/206 |
| 4,822,899 | 4/1989 | Groves et al. | 549/533 |
| 5,141,911 | 8/1992 | Meunier | 502/159 |
| 5,274,090 | 12/1993 | Zhang et al. | 540/145 |
| 5,364,797 | 11/1994 | Olson et al. | 436/501 |
| 5,493,017 | 2/1996 | Therien et al. | 540/145 |
| 5,494,793 | 2/1996 | Schindele et al. | 435/6 |
| 5,516,810 | 5/1996 | Newkome et al. | 521/53 |
| 5,536,834 | 7/1996 | Singh et al. | 544/98 |
| 5,789,333 | 8/1998 | Angelici et al. | 502/113 |
| 5,807,803 | 9/1998 | Cunnington et al. | 502/155 |

FOREIGN PATENT DOCUMENTS

| | | | |
|---|---|---|---|
| 0274909 A2 | 7/1988 | European Pat. Off. . | |
| 2 225 963 | 6/1990 | United Kingdom | 502/167 |
| WO 96/08311 A1 | 3/1996 | WIPO . | |

OTHER PUBLICATIONS

Metalloporphyrins as Versatile Catalysts for Oxidation Reactions and Oxidative DNA Cleavage, Bernard Meunier: pp. 1411–1456: Chem. Rev. (1992), vol. 92. No. 6, no month.

Reversible Adsorption of Oxygen on Silica Gel Modified by Imidazole–Attached Iron Tetraphenylporphyrin: Orlando Leal et al.: Journal of the American Chemical Society. vol. 97. No. 18. Sep. 3, 1975.

Ligand–Assisted Liquid Crystal Templating in Mesoporous Niobium Oxide Molecular Sieves. David M. Antonelli et al.: pp. 3126–3136: Inorganic Chemistry 1996. vol. 35. No. 11. (1996), no month.

Mono–oxygenase–like Oxidation of Hydrocarbons using Supported Manganese–Porphyrin Catalysts: Beneficial Effects of a Silica Support for Alkane Hydroxylation. Pierrette Battioni et al.: Feb. 20, 1989: pp. 1149–1151: J. Chem. Soc.. Chem. Commun.

(List continued on next page.)

*Primary Examiner*—Gary P. Straub
*Assistant Examiner*—Timothy C Vanoy
*Attorney, Agent, or Firm*—Wolf, Greenfield & Sacks, P.C.

[57] ABSTRACT

A system is provided including an article having a surface and a catalytic metal atom, capable of oxidation, covalently immobilized at the surface via a plurality of covalent bonds, but being free of direct covalent bonding to the surface. In particular, the invention relates to inorganic surfaces including silica, alumina, niobium oxide, or tantalum oxide, or a combination thereof and catalytic metal atoms including Fe, Mn, Cr, Ni, Co, Ru, and Os. The catalytic metal atom, covalently immobilized at the surface via a plurality of covalent bonds, can be immobilized via bonding through at least one atom that is bonded directly to the surface. The article preferably is an inorganic, mesoporous structure, in the pores of which are covalently bonded a plurality of metalloporphyrins. In particular, the catalytic metal atom, such as iron, manganese, chromium, nickel, cobalt, rhenium, and osmium are covalently bonded to a porphyrin structure which is bonded to an alumina or silica surface via bonds between the amine groups of the porphyrin structure of the alumina or silica surface. The invention also discloses supporting the catalytic metal atom bonded to the porphyrin structure via amine groups in the porphyrin and dopant atoms of the alumina or silica surface. Dopant atoms can include niobium and tantalum atoms.

25 Claims, 20 Drawing Sheets

OTHER PUBLICATIONS

Synthesis of a Stable Hexagonally Packed Mesoporous Niobium Oxide Molecular Sieve Through a Novel Ligand–Assisted Templating Mechanism: David M. Antonelli et al.. pp. 426–430: Anqew. Chem. Int. Ed. Engl.. 1996. vol. 35. No. 4, no month.

Epoxidation Reactions Catalyzed by Iron Porphyrins. Oxygen Transfer from Iodosylbenzene: John T. Groves et al. pp. 5786–5791: J. Am. Chem. Soc. (1983). vol. 105. No. 18, no month.

Manganese Porphyrins Supported on Montmorillonite as Hydrocarbon Mono–oxygenation Catalysts: Particular Efficacy for Linear Alkane Hydroxylation: Laurent Barloy et al.: pp. 1365–1367: J. Chem. Soc.. Chem. Commun.. (1990), no month.

The Selective Partial Oxidation of Alkanes using Zeolite Based Catalysts. Phthalocyanine (PC) "Ship–in–Bottle" Species; Norman Herron; pp. 25–38; J Coord Chem 1988, vol. 19, (1988), no month.

Olefin Epoxidation and Alkane Hydroxylation Catalyzed by Robust Sulfonated Manganese and Iron Porphyrins Supported on Cationic Ion–Exchange Resins: Sandro Campestrini et al.. pp. 1999–2006: Inorg. Chem. (1992). vol. 31. No. 11, no month.

Hydroxylation of phenol by iron (II)–phenanthroline(Phen)/MCM–41 zeolite; Chibiao Liu et al.; Catalysis Letters vol. 36 pp. 263–266 (Jan, 1996).

5 nm

Si/Al=36
aged at 100°C for 2 days 5 nm

Si/Al=36
aged at 180°C for 2 days 5 nm

METALLOPORPHYRIN OXIDATION CATALYST COVALENTLY COUPLED TO AN INORGANIC SURFACE AND METHOD MAKING SAME

This invention was made with government support under grant number 9257223-CTS awarded by the National Science Foundation. The government has certain rights in the invention.

FIELD OF THE INVENTION

The invention relates generally to surface immobilization of molecules, and more particularly to immobilization of a metal-containing heterocycle at an inorganic surface via covalent linkage remote from the metal.

BACKGROUND OF THE INVENTION

The partial oxidation of hydrocarbons is a very important chemical reaction, and may rank as one of the most difficult of organic transformations. Nature provides partial oxidation of hydrocarbons via the monoxygenase enzymes of the cytochrome P450 family, which generally process xenobiotics to generate hydroxylated metabolites. The reaction utilizes oxygen and a reducing agent to effect alkane oxidation, and involves an intermediate including an iron porphyrin group.

The desire to create synthetic systems for carrying out partial oxidation of hydrocarbons has generated substantial research, and significant developments have been achieved in areas including olefin epoxidations, alkane hydroxylations, oxidations of pollutants, drugs, sulfur-or nitrogen-containing molecules, and the like, as reviewed by B. Meunier in "Metalloporphyrins as Versatile Catalyst for Oxidation Reactions and Oxidative DNA Cleavage", *Chem. Rev.*, 92, 1411–1456 (1992). Metalloporphyrins have been effectively utilized in the catalytic oxidation of hydrocarbons to produce a variety of valuable fine chemicals.

One example of a partial oxidation reaction is that of alkene to epoxide involving iron porphyrin as a catalyst. In the reaction, four of six available iron coordination sites of the iron porphyrin complex are occupied by the essentially planar porphyrin ring, and one of the free remaining iron coordination sites, which faces out of the plane of the porphyrin ring, is involved in the oxidation reaction, demonstrating the need for accessibility of the side of the porphyrin ring to reactants. In particular, oxygen transfer to the metal center from an oxidant, followed by association of a hydrocarbon with the oxygen at the metal center and subsequent partial oxidation, is required.

Synthetic metalloporphyrins that lack nature's globin protection must maintain physical separation of the porphyrins' active metal sites to avoid self-oxidation. If not, during the catalytic reaction, monomeric oxo-metal adducts can be converted to $\mu$-oxo dimers by auto-oxidation and catalytic activity can be lost. This demonstrates the need for efficient heterogeneous catalysis systems, that is, systems in which a solid phase carrying a catalyst is contacted with a fluid phase containing reactant and oxidant. In such systems catalytic metal centers can be maintained in isolation from each other, and the catalyst can be easily recovered. Because of the importance of catalysts involving metal porphyrins, substantial efforts have been devoted to development of solid-phase-supported metalloporphyrin catalyst systems. Description of some of these efforts can be found in the following references.

Campestrini and Meunier, in "Olefin Epoxidation and Alkene-Hydroxylation Catalyzed by Robust Sulfurated Manganese and Iron Porphyrins Supported on Cationic Ion-Exchange Resins", *Inorg. Chem.*, 31, 1999 (1992) describe immobilization of metalloporphyrins to polymers either via direct attachment of the metal to the polymer by coordination of a pyridine unit on the polymer to the metal center, by electrostatic attraction of functional groups such as $SO_3^-$ on the porphyrin ring with functional groups such as $NR_4^+$ on the polymer, or both.

U.S. Pat. No. 5,141,911 (Meunier, et al.) describes metalloporphyrins carrying anionic groups as substituents in which the metalloporphyrins are immobilized on a support which is made of a polymer containing nitrogenous groups used as a Lewis base.

Barloy, et al., in "Manganese Porphyrins Supported on Montmorillonite as Hydrocarbon Mono-oxygenation Catalysts: Particular Efficacy for Linear Alkene Hydroxylation", *J. Chem. Soc., Chem. Commun.*, 1365 (1990) describe immobilization of manganese porphyrin complexes on clay. The mode of binding of the complex to the clay is not fully characterized, although UV-visible spectroscopy shows two intense peaks at 471 and 496 nm, corresponding to two different environments of manganese. No peak corresponding to the free base porphyrin was observed.

Battioni, et al., in "Mono-oxygenase-like Oxidation of Hydrocarbons Using Supported Manganese-Porphyrin Catalysts: Beneficial Effects of a Silica Support for Alkene Hydroxylation", *J. Chem. Soc., Chem. Commun.*, 1149 (1989), described manganese porphyrin adsorbed on silica, alumina, and magnesia.

N. Herron, in "The Selective Partial Oxidation of Alkenes Using Zeolite Based Catalysts. Phthalocyanine (PC) 'Ship-in-Bottle' Species", *J. Coord. Chem.*, 19, 25 (1988) describe iron phthalocyanine complexes immobilized within pores of zeolites.

Liu, et al., in "Hydroxylation of phenol by iron(II)-phenanthroline(Phen)/MCM-41 zeolite", *Catalysis Letters*, 263–266 (1996) describe immobilization of iron (II)-phenanthroline within the hexagonally-packed cylindrical pores of MCM-41 silica. Liu, et al. state that immobilization may be due to adsorption and static coulombic interactions between the surface of MCM-41 and the iron (II)-phen species.

Leal, et al., *J. Am. Chem. Soc.*, 97, 5125 (1975), describe covalent attachment of metalloporphyrins to polymers.

U.S. Pat. No. 5,274,090 (Zhang, et al.) describes covalent attachment of a crown ether to two diagonally opposing phenyl groups of a metalloporphyrin, and a molecular bridge covalently linking two diagonally opposing phenyl groups on the side of the porphyrin opposite the crown ether effective to hinder $\mu$-oxo dimer formation.

While advances in immobilization of metal porphyrins on surfaces have been made, most systems are not optimal. Many prior art systems involve non-covalent interaction between catalyst and support (ionic or static interaction), which can be weaker than desirable and can result in leaching of the catalyst from the surface over time. Some systems involve catalyst immobilization via interaction of the catalytic metal center with the surface which, while effective in some circumstances, can in some cases hinder the metal's participation in catalysts. Some systems use solid phase support that have small pores that can cause deformation of the metal catalyst, potentially adversely affecting catalytic performance, and which may not allow sufficient access by reactants. Polymers covalently linked to catalytic systems do not offer the structural advantage of inorganic solid phases, which can self-assemble as mesoporous supports that provide high surface areas, that define uniform channels forcing reactants to be brought into close proximity with immobilized catalyst, and that can offer selectivity in terms of both reactants and products. In addition, in some instances it can be advantageous to conduct a reaction involving an immobilized catalyst at a temperature above the degradation temperature of some polymers.

It is, therefore, an object of the invention to provide a catalyst including a catalytic metal atom immobilized at a surface in a manner providing long-term, high-capacity operation, and allowing easy access of reactants to the catalytic metal atom.

SUMMARY OF THE INVENTION

The present invention provides robust, surface-immobilized oxidation catalysts and methods of making and using such catalysts. In one aspect, the invention is a system including an article having an inorganic surface and a catalytic metal atom covalently immobilized at the surface. The atom can be one that is capable of catalyzing an oxidation reaction of a reactant and an oxidant, and is immobilized via a plurality of covalent bonds, at least one of which involves the metal atom. However, the metal atom is free of direct covalent bonding to the surface, allowing more facile access of reactants and/or oxidants to the metal atom under certain circumstances. One covalent bond, or a plurality of covalent bonds, can attach to the surface and provide covalent immobilization of the metal atom.

In another aspect, the invention involves a system including a solid phase structure having pores. The pores together define an average pore diameter and at least 90% of the pores have a diameter that differs from the average pore diameter by not more than about 200%. The system includes a catalytic metal atom capable of catalyzing an oxidation reaction of a reactant and an oxidant covalently immobilized at the surface with the metal atom being free of direct covalent bonding to the surface.

According to another aspect, the invention is a system including a solid phase structure having a surface doped with a metal present in the structure in an amount of not more than 25 mol %. An oxidation catalyst including a catalytic metal atom is chemically immobilized at a surface of the structure via the metal doped at the surface.

In another aspect, the invention provides a system including a porous solid phase structure having an inorganic surface and an oxidation catalyst including a catalytic metal atom chemically immobilized to an interior surface of a pore of the porous solid phase structure.

A method is provided according to another aspect of the invention that involves providing a solid phase structure having an inorganic surface and covalently immobilizing a catalytic metal atom at the surface. The catalytic metal atom is capable of catalyzing an oxidation reaction of a reactant and an oxidant provided to the metal atom.

The invention also provides a method of use of a surface-immobilized catalyst. The method involves providing an article having an inorganic surface carrying a plurality of surface-immobilized catalytic metal atoms. A reaction is carried out under set conditions involving conversion of a reactant to an oxidized product at the surface. The reaction proceeds via a mechanism involving the catalytic metal atoms. The reaction is carried out under the set conditions to convert the reactant to the oxidized product until a particular percent conversion level of reactant to oxidized product is established that does not vary by more than about 5% over 24 hours of the reaction under the set conditions. Then, the reaction is carried out under the set conditions for at least 72 hours, and subsequently carried out under the set conditions at a percent conversion level of at least about 70% of the particular percent conversion level.

A variety of preferred embodiments are described including, for example, dopant metal atoms provided in various preferred amounts, catalytic metal atoms, solid phase structures, covalent linkages, pore sizes and uniformity of pore size, pore structure, and the like. It is to be understood that any particular exemplary or preferred item, amount, range, or the like can be utilized with any other item, amount, range, or the like so long as the essence of the invention for the particular embodiment is achieved.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure.

DETAILED DESCRIPTION OF THE INVENTION

Figure 1:
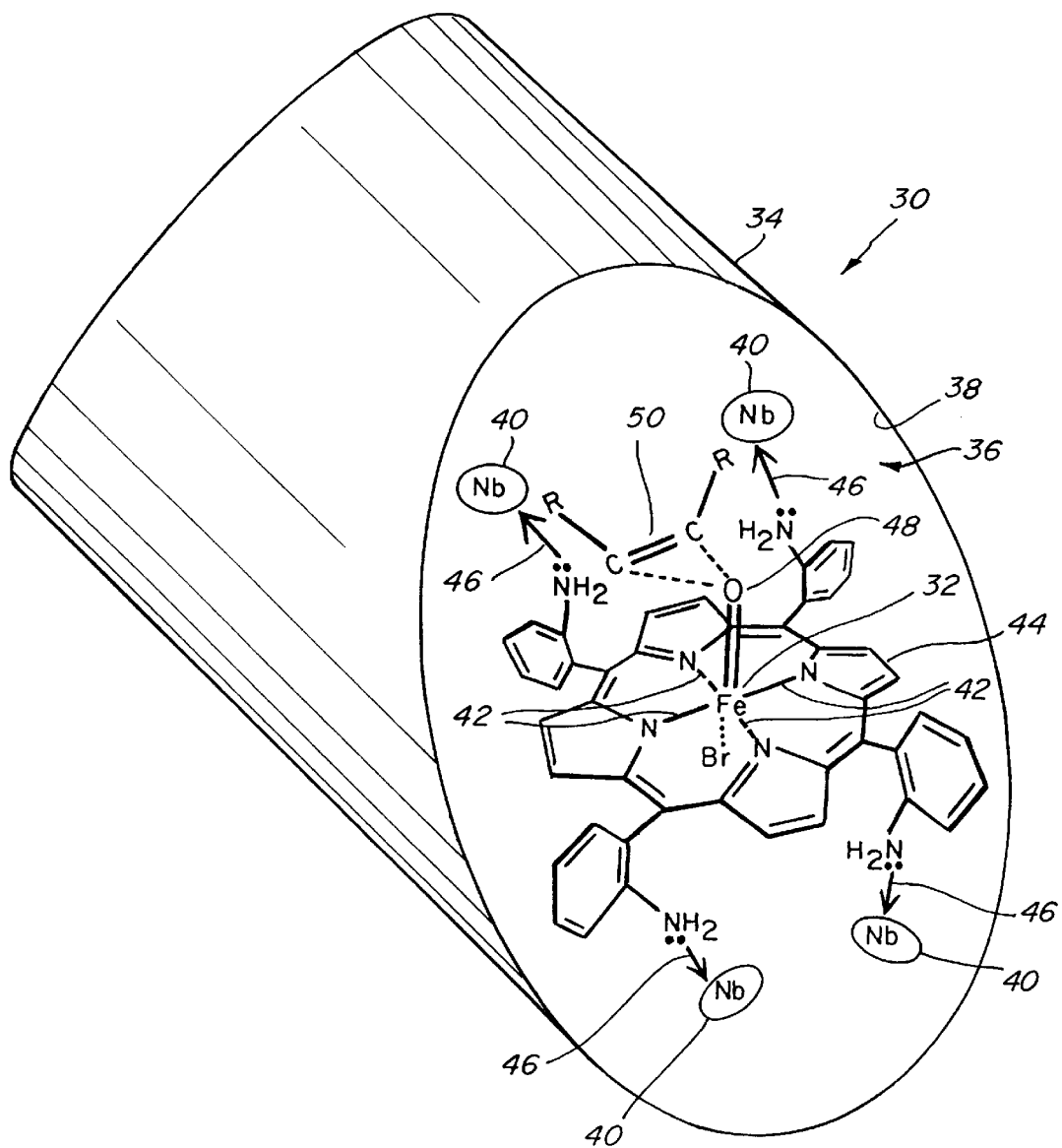
FIG. 1 is a schematic illustration of a mesoporous solid phase structure including a pore in which a catalytic metal atom is covalently immobilized without direct covalent bonding between the metal and the surface of the pore.

The present invention provides a technique for immobilizing a catalytic metal atom at a support in a manner allowing secure immobilization of the metal to the support and easy access of reactants to the metal atom. Reactants, in this context, include substances to be oxidized, oxidants, and any other species desirably brought into proximity of a metal center for effecting a reaction at the metal center.

In a preferred embodiment, the invention involves an inorganic surface at which the metal atom is immobilized. An inorganic surface provides certain advantages, including the ability for component atoms to assemble in a regular, packed array that facilitates formation of relatively uniform pores of generally controlled size. Control over the uniformity and size of pores of the catalyst solid phase support of the invention allows control over access of reactants to the catalyst since a fluid in which the reactants are provided more readily addresses the catalyst. Accordingly, in most preferred embodiments, the article upon which the catalytic metal atom is supported is entirely composed of inorganic material. Another advantage of inorganic materials is that dopant atoms that can facilitate immobilization of a catalytic metal atom to the surface can be readily incorporated into an inorganic material securely, for example as a component of a regular packed array. The dopant metal can be involved in covalent attachment of a chemical framework that is covalently attached to the catalytic metal atom according to one embodiment, or can increase surface hydroxyl groups for chemical bonding of a catalytic metal atom according to a second embodiment.

Thus, the article of the invention need not be entirely inorganic but, in preferred embodiments, should have an inorganic surface. Where the article is not entirely inorganic the inorganic surface should define a portion of the article having a thickness great enough for regular packing to occur, especially where a doping metal is employed.

The inorganic article can be any inorganic structure such as a ceramic including silica, alumina, various transition metal oxides, and the like. Preferred are those inorganic articles that self-assemble as hexagonally-packed or cubic-packed mesoporous (pore size from about 10 Å to about 200 Å) materials including at least 50 mol % transition metal or main group oxides, in particular at least 50 wt % silica or alumina. Particularly preferred are those mesoporous metal oxide molecular sieves termed MCM-41, some of which are described in U.S. Pat. Nos. 5,057,296, 5,098,684, and 5,102,643, incorporated herein by reference. Mesoporous materials are preferred because of their large and uniform pore sizes which allow sterically-hindered molecules to easily diffuse to internal active sites.

Mesoporous materials are also important because the regular pore structure can serve as a support for conductive and magnetic materials, which make up another class of useful embodiments of the invention. Representative suitable inorganic articles also are described by Antonelli, et al., in "Ligand-Assisted Liquid Crystal Templating in Mesoporous Niobium Oxide Molecular Sieves", *Inorg. Chem.*, 35, 3126 (1996); Antonelli and Ying, "Synthesis of a Stable Hexagonal Packed Mesoporous Niobium Oxide Molecular Sieve through a Novel Ligand-Assisted Templating Mechanism", *Angew. Chem. Int. Ed. Engl.*, 35, 426 (1996), and are described in a co-pending, commonly-owned U.S. patent application Ser. No. 08/415,695 of Ying, et al., incorporated herein by reference in which materials are described that are designated M-TMS1. The article preferably is selected so as not to decompose or substantially deform at temperatures above 100° C., and preferably is selected so as not to swell in water or in an organic solvent. Preferred materials will not swell more than 1% in an organic solvent, and more preferred materials will swell less than 0.5%, more preferably less than 0.05%. These advantages are achieved when preferred inorganic articles are selected, and provide the opportunity to conduct reactions at high temperatures, such as reactions in which oxygen may be used as an oxidant, and/or reactions involving an organic fluid phase for providing reactants including oxidants to the catalytic metal atom.

Another set of preferred articles, included in the MCM-41 sieves as noted and referenced above, are solid phase structures including uniform pores. This means that the pores have diameters that together define an average pore diameter, and at least 90% of the pores have a diameter that differs from the average pore diameter by not more than about 200%. In preferred embodiments, at least 90% of the pores differ from the average pore diameter by not more than about 150%, more preferably no more than about 100%, more preferably still not more than about 50%, more preferably still not more than about 25%, and most preferably not more than about 20%. The pores preferably are at least about 5 Å in diameter, more preferably at least about 10 Å, more preferably at least about 15 Å, more preferably still at least about 20 Å, and most preferably at least about 25 Å, and the pores preferably are essentially tubular (including, by definition, any structure such as a circular cross-sectional structure that propagates in a pathway that is closed with the exception of intersections with other, similar pathways. For example, the pores may propagate in an essentially singular direction, i.e., the pores may define a series of straight tubes all oriented in the same direction. Alternatively, the pores may define straight pathways that are arranged in one of three, perpendicular axes. Alternatively still, the pores may propagate in a direction that changes, i.e., they may be winding pathways that intersect each other. The tubular pores have a length-to-diameter (length to average diameter) ratio that is at least 10:1, more preferably at least about 25:1, and more preferably still at least about 50:1). These features are selectable also by those of ordinary skill in the art with the aid of the present disclosure for direction.

In another set of preferred embodiments, the article for supporting the catalytic metal atom is a porous solid phase structure having a surface doped with a dopant metal present in the structure in an amount of not more than about 25 mol % based on the weight of the structure. In one set of embodiments, a dopant metal can serve as a location for covalent attachment of a molecular structure including the catalytic metal atom to the surface in a manner in which the catalytic metal atom is itself not directly linked to the surface. An example of such an arrangement is covalent immobilization of a metal atom contained in a molecular framework, such as a porphyrin, which occupies four of six available coordination sites. In this arrangement, the remaining two coordination sites of the metal are not involved in immobilization of the metal to the surface, but the molecular framework within which the metal atom is contained is involved in attachment to the surface.

In another set of embodiments the dopant metal can serve as a location for chemical immobilization of the catalytic metal atom directly at the surface. That is, the catalytic metal atom can be chemically immobilized at the surface via the dopant metal. As used herein, "chemically immobilized via the dopant metal" means chemical bonding between the catalytic metal atom and the dopant metal via no more than one linkage. For example, a dopant metal including a hydroxyl group bonded to the catalytic metal atom via the hydroxyl group is embraced this definition. In preferred embodiments, the dopant is present in the solid phase structure in an amount less than about 20 mol %, more preferably less than about 15 mol %, and more preferably still less than about 10 mol %.

Where the dopant is selected so as to facilitate covalent interaction between a molecular structure including the catalytic metal atom, the dopant can be selected so as to interact with, for example, a functional group of a porphyrin ring, or otherwise capable of bonding to an organic-containing linkage including —N, —S, —P, or the like. The dopant preferably is Al, Ti, Nb, or Ta, and preferred covalent immobilization of a molecular structure including the catalytic metal atom to a dopant atom involves catalysts including porphyrin rings N-coordinated to Nb and/or Al dopant. An inorganic structure can be doped with metal atoms from such precursors as aluminum sulfate, niobium ethoxide, and titanium ethoxide. Those of ordinary skill in the art, with reference to atomic radius and bond length data relevant to a dopants, can select a dopant level that will not effect adversely the packing structure of an inorganic material including the dopant.

The catalytic metal atom can be any atom, typically a transition metal atom such as V, Nb, Ta, Cr, Mo, W, Mn, Tc, Re, Fe, Ru, Os, Co, Rh, Ir, Ni, Pd, Pt, and the like capable of catalyzing, via a free coordination site, an oxidation reaction. Particularly preferred are Fe, Mn, Cr, Ni, Co, Ru, and Os. The catalytic metal atom, as noted, is capable of catalyzing an oxidation reaction of a reactant and an oxidant provided to the metal atom. Those of ordinary skill in the art will recognize when a metal atom is provided in such a state, for example, as supported via coordination that allows free coordination sites to remain. Examples of assemblies of atoms that allow support of the catalytic metal atom in a manner such that free coordination sites remain are provided below.

In one set of embodiments, the catalytic metal atom is covalently immobilized at the surface via a plurality of covalent bonds. One of these covalent bonds involves the metal atom, and the metal atom is free of direct covalent bonding to the surface. "Covalent", as used herein, is meant to include covalent bonds as well recognized in the art, and such covalent linkage can be created with suitable functionality such as, for example, amine, alcohol, carbamate, carboxylic acid, thiol, aldehyde, olefin, etc., which will facilitate formation of ester and amide linkages, thiol displacement and thio ether formation, and the like. "Covalent" is also meant to include coordinate covalent bonds between an organic ligand and metal in which an atom of a chemical moiety contributes a pair of unshared electrons to form a covalent bond with a metal, for example those bonds between metal and substituent in complex ions such as $Cu(NH_3)_4^{2+}$, $Al(H_2O)_3^{3+}$, $Zn(H_2O)_3(OH)^+$, coordination compounds such as $[Pt(NH_3)_4]Cl_2$, $K_2[PtCl_4]$, and the like. Coordinate covalent bonds can be formed between certain metal atoms and reactive moieties such as amines, ethers, sulfides, phosphines, esters, amides, acids, pyridines, ketones, aldehydes, carbenes, and preferably a combination of one or more of these to form multi-dentate arrangements. Multi-dentate ligands include multidienes such as pentadienes, amino acids, cycloaromatics such as cyclopentadienes, salicylic acid, phenanthroline carboxylic acid, bipyridyl carboxylic acid, aza crown ethers, trioctylphosphine oxide, aza cryptands, phenanthroline, 4-perfluorobutyl-3-butanone, 2,2'-dipyridyl, and the like.

The arrangement in which the catalytic metal atom is covalently immobilized at the inorganic surface, but is not directly covalently bound to the surface (no direct covalent bond between the metal and the surface exists) can be provided by incorporation of the metal into a molecular supporting structure (such as a multi-heterocyclic molecule including portions that can act as ligands in relation to the metal, e.g. a phthalocyanine or other porphyrin), and covalent linkage between the metal-supporting organic structure and the inorganic article. This covalent linkage is particularly well facilitated when the inorganic surface is doped with a binding assistant such as Nb or Ta, or is a surface made completely of a material such as $NbO_2$. The chemistry of porphyrins is well-developed and those of ordinary skill in the art can synthesize porphyrins so as to be amenable to covalent bonding with a surface as described herein. U.S. Pat. No. 5,493,017 (Gherien, et al.), incorporated herein by reference, describe chemical modification of porphyrin structures in a manner that exemplifies chemistry that could be used to covalently immobilize a porphyrin to a surface according to the invention. A variety of suitable metal porphyrins that could be altered for covalent attachment to a surface also are described by B. Meunier, *Chem. Rev.*, 92, 1411 (1992).

Referring now to FIG. 1, a system 30 including a surface-immobilized catalytic metal atom 32 is illustrated schematically. System 30 includes an article 34, preferably an inorganic article including a plurality of pores, one of which is represented by opening 36. Pore 36 includes an interior surface 38 which includes metal atoms 40 that form part of article 34 naturally or are doped into article 34.

Catalytic metal atom 32 is covalently immobilized at surface 38 via a plurality of covalent bonds, at least one of which involves the metal atom. In the embodiment illustrated, bonds 42 between metal atom 32 and nitrogen atoms of a porphyrin ring 44 within which metal atom 32 resides, represent covalent bonds involving metal atom 32, via which metal atom 32 is covalently immobilized at surface 38. A series of covalent bonds between bonds 42 and surface 38 includes a final covalent linkage provided by bonds 46 which, as illustrated, are formed between metal atoms 40 of surface 38 and pendant groups of porphyrin structure 44. Porphyrin structure 44 thus represents a multi-heterocyclic structure which, in combination with catalytic metal atom 32, allows free coordination sites to exist on the metal atom above and below the plane of porphyrin ring 44. As illustrated, an oxidant has provided oxygen atom 48 to catalytic metal atom 32 and a reactant 50, and alkene, is in the process of undergoing partial oxidation such as epoxidation via a reaction involving catalytic metal atom 32.

While the embodiment illustrated schematically in FIG. 1 represents one preferred arrangement of the invention, an oxidation catalyst of the invention can include a catalytic metal atom chemically bonded to an interior surface of a pore of a porous solid phase. As used herein, "chemically bonded" is meant to include covalent bonds, ionic interaction, static and coulombic interactions, and the like.

Referring again to FIG. 1, it can be seen that, depending upon the size of pore 36 (which can be adjusted based upon available inorganic mesoporous technology), the orientation of multi-heterocycle 44 will depend upon the size of the pore in relation to the size of the heterocycle and the number and location of covalent bonds between the heterocycle and surface 38. As illustrated, four covalent bonds to surface 38 exist, although any number can be formed. Where the pore is quite large relative to the size of the heterocycle, the plane of the heterocycle may be oriented substantially perpendicular to the axis of the pore. Where the pore is of a relatively smaller size, as illustrated, the axis of pore 36 may be contained in, or almost contained in, the plane of heterocycle 44. It can be seen that ready availability of reactants and oxidants to catalytic metal atom 32 can be provided. Mesoporous articles having various set pore sizes can be made and selected in combination with a catalytic metal atom-supporting molecular framework of a particular size to allow ready access of a reactant-carrying fluid. For example, porphyrins are generally of about 15–20 Å diameter, thus immobilization of a porphyrin in a pore of about 20–30 Å would be suitable.

The invention provides a particularly robust immobilized catalyst that can play a role in a method of the invention that involves carrying out catalysis over an extended period of time without loss of capacity. An inorganic surface carrying a plurality of surface-immobilized catalytic metal atoms will facilitate a first percent conversion of a reactant to an oxidized product under set conditions, such as specific carrier fluid flow rate, temperature, reactant/oxidant concentration, and the like that does not vary by more than about 5% over 24 hours. That is, the percent conversion of the reaction generally will increase and reach a plateau where the percent conversion of the reaction does not vary by more than about 5% over 24 hours. Subsequently, the reaction is carried out under the set conditions for at least 72 hours and, after 72 hours, the reaction is carried out under the set conditions and achieves a percent conversion level of at least about 70% of the first percent conversion level. Preferably, the reaction is carried out at that point at a percent conversion level of at least about 75% of the first percent conversion level, more preferably at least about 80%, more preferably at least about 85%, and more preferably still at least about 90% of the first conversion level. In particularly preferred embodiments, the reaction is carried out initially until the plateau is reached, then carried out for at least about 120 hours, and subsequently carried out at a percent conversion level of at least about 75% of the original percent conversion, or one of the more preffered levels recited above.

This invention provides a means for the immobilization of metalloporphyrins on metal-doped mesoporous molecular sieves. In contrast to conventional supported metalloporphyrin catalyst, the metalloporphyrins encapsulated in the metal-doped mesoporous silica are stable, thereby providing a high catalytic activity during partial oxidation reactions. The mesoporous supports facilitate rapid diffusion for reactants and products of large molecule size, and the pore structure of the support is tailorable for a variety of purposes, for example pore size can be varied and dopant concentration can be tailored to maximize catalytic activity while preventing catalyst-catalyst interactions resulting in self-oxidation. E.g. the composition of the porous support can be extended from low Al concentration up to pure $Al_2O_3$. By introducing specific chiral sites on a metalloporphyrin macrocycle, asymmetric epoxidation may also be achieved to produce chiral compounds at high yields. The doped mesoporous silica with high surface area can also be ideal for hosting various active organometallic complexes, such as Mn(III), Ni(II), and Cr(III) porphyrins, and precious-metal complexes that are widely used in catalytic organic synthesis and petroleum industry.

The heterogeneous catalysts obtained through this synthesis strategy is of potential importance in various partial oxidation reactions under mild reaction conditions and, in preferred embodiments, harsh reaction conditions can be tolerated.

The function and advantage of these and other embodiments of the present invention will be more fully understood from the examples below. The following examples are intended to illustrate the benefits of the present invention, but do not exemplify the full scope of the invention.

EXAMPLE 1

Synthesis of Nb-doped porous solid phase structures

Metal-doped mesoporous solid phase materials, specifically Nb-doped materials were synthesized from an inorganic siliceous precursor (trimethylammonium silicates (TMAS), or 27% sodium silicate solution) and an organic cationic trimethylammonium surfactant ($C_nH_{2n+1}(CH_3)_3NBr$).

In the first case, 50 g of TMAS was stirred for 10 min after the addition of 0.5 g of sulfuric acid ($H_2SO_4$). 6.8 g of cetyltrimethyl ammonium bromide (CTMABr) dissolved in 20.3 g of water ($H_2O$) was then mixed with TMAS solution and stirred for 30 min. A desired amount of niobium ethoxide dopant precursor (see molar ratios in Table 1) was gradually introduced into the silica loosely bounded and stirred for 30 min. 10 g of $H_2O$ was then added to the gel which was then aged at a constant temperature within the range of 100–180° C.

In the second case, 3.65 g of CTMABr was completely dissolved in $H_2O$. To this solution, 22.2 g of sodium silicate dispersed in 50 g water was slowly added at room temperature with vigorous stirring. The pH of the mixture was adjusted to 11.5 by diluted $H_2SO_4$, and dopant precursor was gradually introducing into the silica gel. The resulted gel mixture was continuously stirred for 3 hours at room temperature before it was aged hydrothermally at a temperature range of 100–180° C.

In both cases, the molar composition of the final gel could be represented as 1 $SiO_2$:0.1 CTABr:120 $H_2O$:x$M^{y+}O_{y/2}$ (where x=0 to 1 and M is the metal dopant). The crystallized solid was washed with ethanol and water, filtered, and then calcined at 540° C. in air for 8 hours to remove organics. The samples obtained from the above two cases are designated respectively as M/Si-TMS8, and M/Si-TMS9 (Si:M=R), where R is given by the molar ratio of Si and M.

Figure 2:
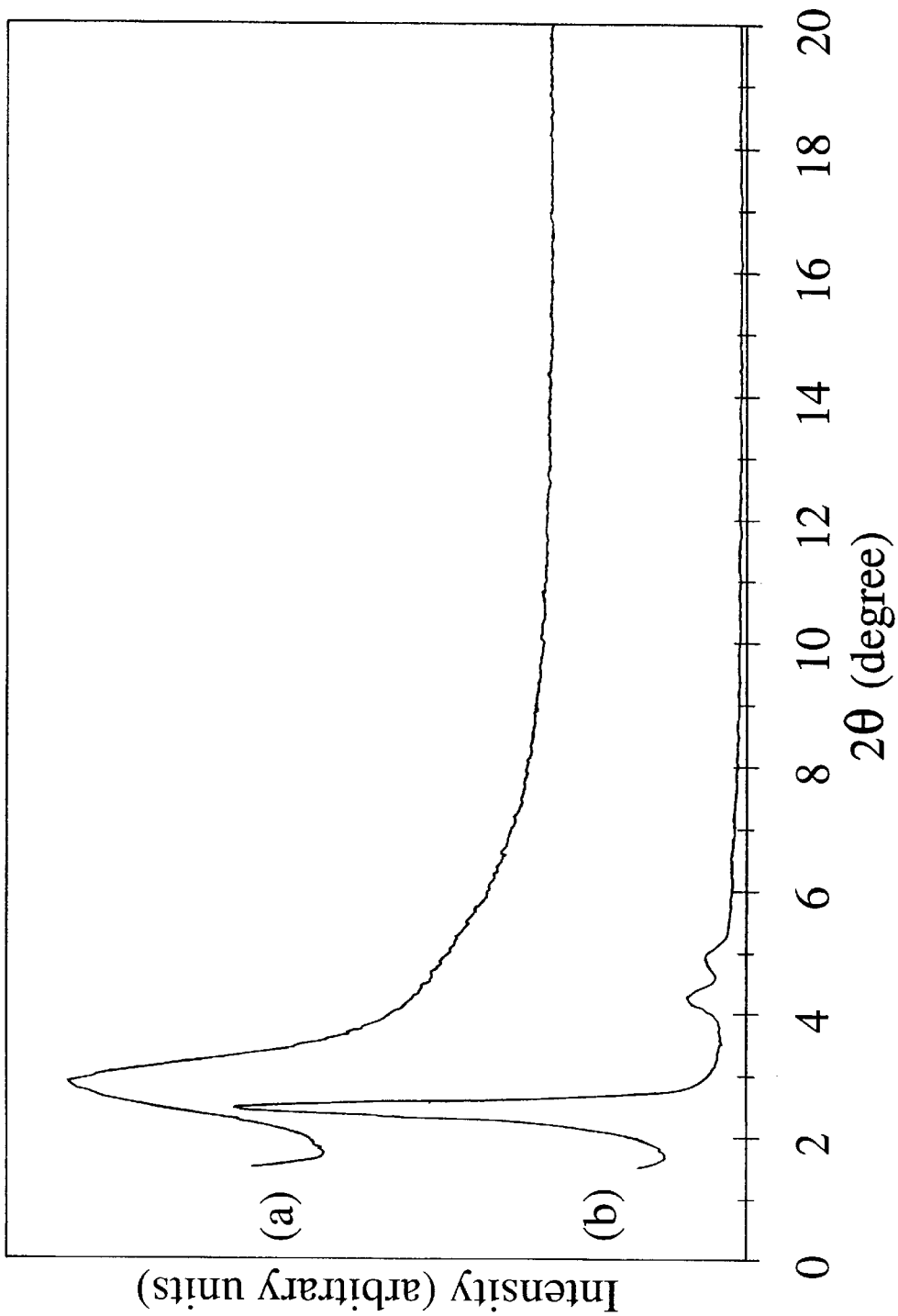
FIG. 2 shows X-ray diffractometry (XRD) patterns of niobium(Nb)-doped siliceous solid phase structures designated Nb/Si-TMS8(a) and Nb/Si-TMS9(b)
Figure 3:
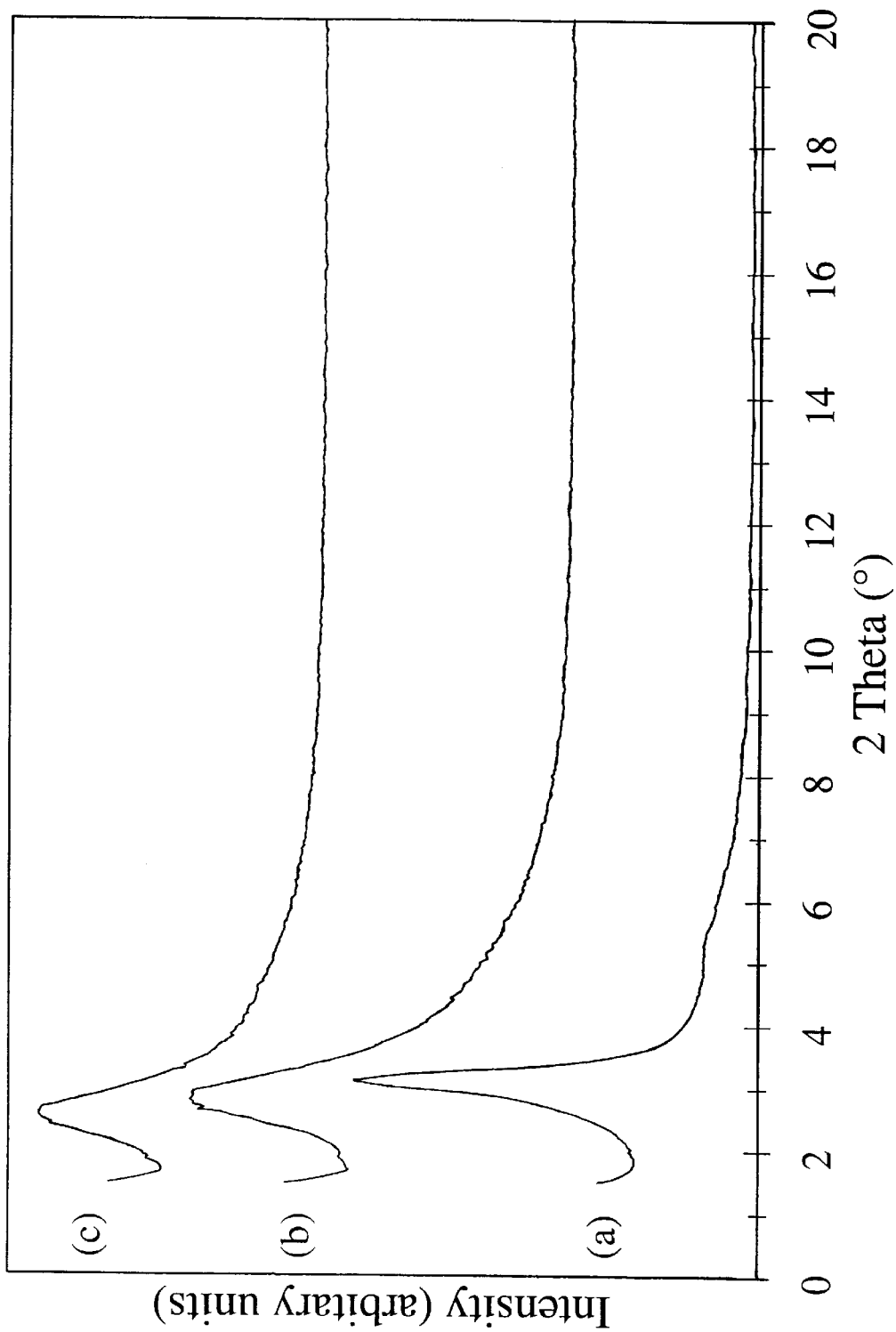
FIG. 3 shows XRD patterns of a mesoporous siliceous solid phase and Nb-doped siliceous solid phases at different doping levels.
Figure 4:
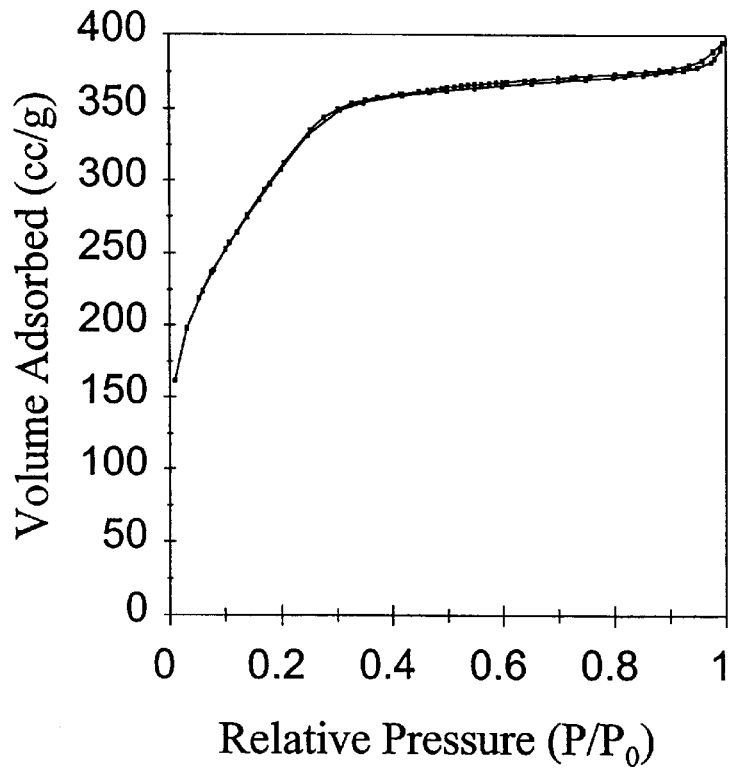
FIG. 4 is an adsorption-desorption isotherm of a Nb-doped siliceous mesoporous structure.
Figure 5:
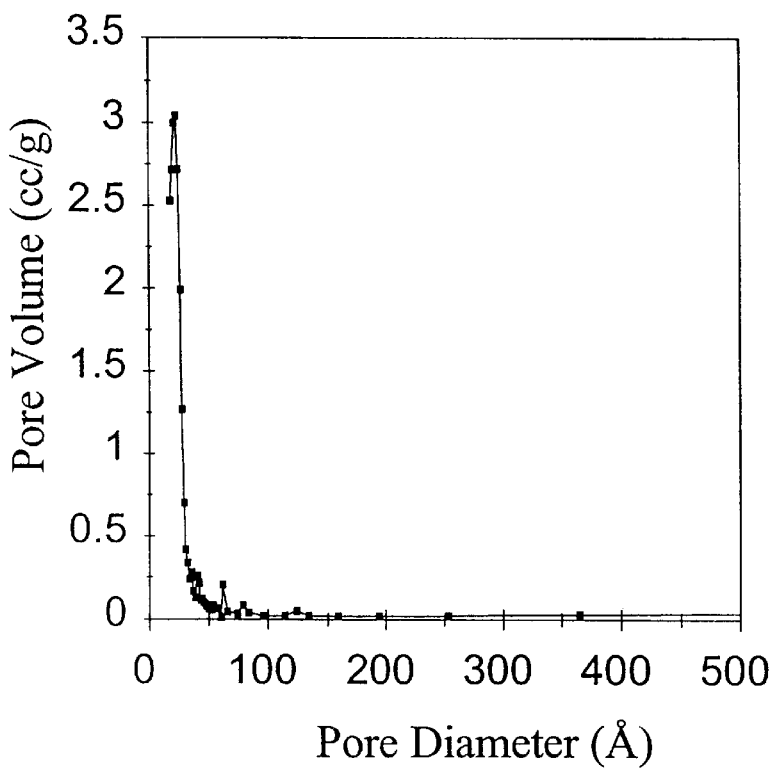
FIG. 5 shows Barrett-Joyner-Halenda (BJH) pore size distribution calculated from the desorption isotherm of FIG. 4.
Figure 6:
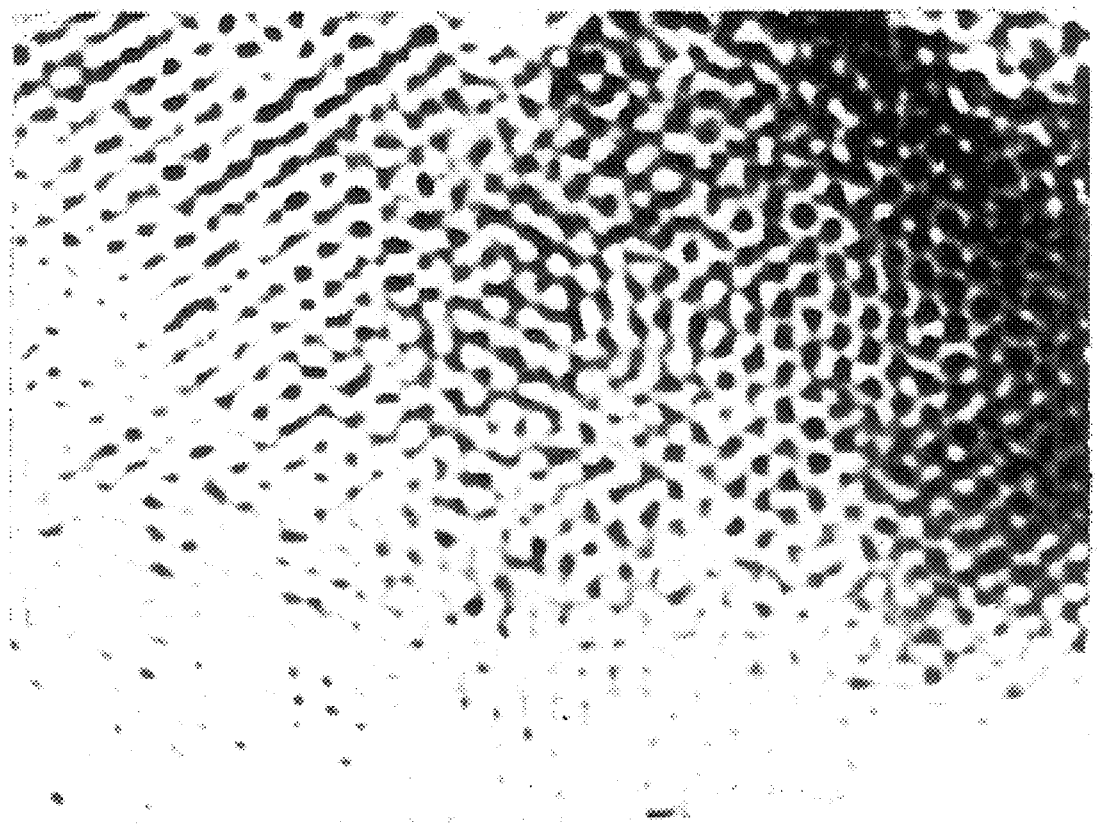
FIG. 6 is a photocopy of a transmission electron micrograph (TEM) image of a hexagonally-packed mesoporous Nb-doped siliceous solid phase structure.

The doped mesoporous silicas were characterized by X-ray diffractometry (XRD) and transmission electron microscopy (TEM). In the case of Nb-doped mesoporous silica, the XRD patterns of calcined Nb/Si-TMS8 (Si:Nb=20) and Nb/Si-TMS9 (Si:Nb=20) shown in FIG. 2 correspond to a typical hexagonal P6mm space group. Only the (100) peak was resolved in the Nb/Si-TMS8 (Si:Nb=20) XRD pattern (curve a of FIG. 2). The Nb/Si-TMS9 (Si:Nb=20) sample showed the high-intensity (100) peak as well as three well-resolved peaks corresponding to (110), (200) and (210) diffractions (curve b of FIG. 2), indicating that a high crystallinity was achieved using the second synthesis approach compared to the first approach. The unit cell parameters of the Nb-doped $SiO_2$ were found to depend strongly on the aging temperature and the Nb dopant concentration. It was shown that the d(100) spacing and crystallinity increased with the aging temperature. At a given temperature, the unit cell parameter calculated by $a_0=2d(100)/\sqrt{3}$ is larger for Nb/Si-TMS8 than for the undoped Si-TMS8 and increases with an increase in the Nb-dopant concentration due to larger ionic radius of $Nb^{5+}$ (0.64 Å) and longer Nb—O bond length (1.69 Å) (FIG. 3). The $N_2$ adsorption-desorption isotherm shown in FIG. 4 presents no hysteresis and corresponds to a narrow pore size distribution centered at 22 Å (FIG. 5). BET (Braunauer-Emmett-Teller) surface areas of the Nb/Si-TMS8 samples were greater than 1000 $m^2/g$, depending on the dopant concentration. For the Nb/Si-TMS9 (Si:Nb=20) sample, BET surface area of around 822 $m^2/g$ was obtained and this value decreased with increasing Nb concentration due to larger Nb atomic weight. Characteristics of Nb-doped silica mesoporous materials produced according to this example are listed in Table 1. The TEM micrograph of Nb/Si-TMS9 (Si:Nb=20) (FIG. 6) clearly shows a hexagonally-packed pore array with average pore diameters of 26 Å.

TABLE 1

Characteristics of porous Nb/Si-TMS8 and Nb/Si-TMS9 solid phase structures

|  | $a_0$ (Å) | pore size (Å) | wall thickness (Å) | surface area ($m^2$/g) |
|---|---|---|---|---|
| Nb/Si-TMS8 (Si:Nb = 100) | 36 | 22 | 14 | 1358 |
| Nb/Si-TMS8 (Si:Nb = 20) | 37 | 22 | 15 | 1477 |
| Nb/Si-TMS8 (Si:Nb = 10) | 39 | 24 | 15 | 1140 |
| Nb/Si-TMS9 (Si:Nb = 20) | 41 | 23 | 18 | 822 |

EXAMPLE 2

Functionalization of catalytic metal atom-supporting chemical structure for covalent immobilization at a surface without direct covalent bonding between the metal atom and the surface An amine-substituted iron porphyrin was synthesized following a literature procedure (see; Collman, et al. *J. Am. Chem. Soc.* 97, 6, 1427 (1975)). In the first step, meso-tetra(nitrophenyl) porphyrin ($H_2T_{NO2}PP$) was synthesized by dissolving 27.5 g of p-nitrobenzaldehyde in 250 ml of refluxing glacial acetic acid, followed by dropwise addition of 11.6 ml of pyrrole with further reflux for 20 min. The resulting dark purple solution was cooled with an ice bath to 35° C. after addition of 67.5 ml of chloroform ($CHCl_3$). The crystalline purple solid was collected by filtration and washed with $CHCl_3$. The free porphyrin was dried in vacuum oven at 100° C. overnight.

The $H_2T_{NO2}PP$ obtained was used in the second step of the reaction scheme to synthesize meso-tetra(o-aminophenyl)porphyrin ($H_2T_{NH2}PP$) by reduction of the $NO_2$ groups to $NH_2$ groups. 4 g of tetra(nitrophenyl) porphyrin was dissolved in 200 ml hydrochloric acid at room temperature. 16.7 g of a reducing agent, tin chloride dihydrate ($SnCl_2.2H_2O$), was then added into the porphyrin solution and quickly heated to 65–70° C. for 25 min. The resulting green solution was neutralized by slow addition of concentrated ammonia. 300 ml of $CHCl_3$ was then added to the solution. The mixture was stirred for 1 hour before extraction of the $CHCl_3$ layer. The $CHCl_3$ phase was reduced to 200 ml by a rotary evaporator, washed with aqueous ammonia and water and dried over anhydrous sodium sulfate ($Na_2SO_4$). A further purification was conducted by addition of 100 ml of ethanol and 50 ml of heptane. A purple crystalline powder was obtained after solvent evaporation and methanol washing.

Figure 7:
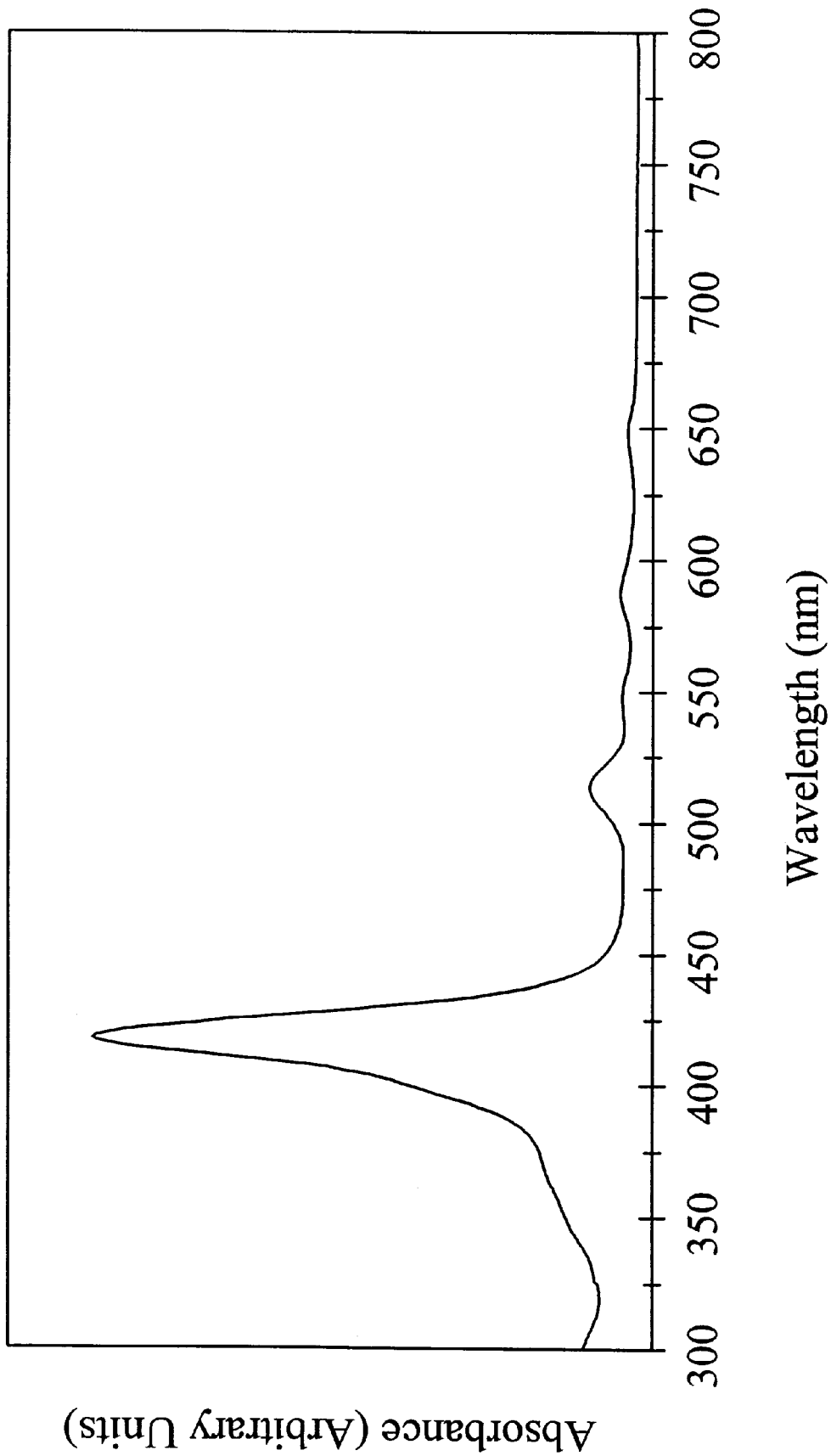
FIG. 7 is a UV-Vis spectrum of a free porphyrin.

Elemental analysis of the free porphyrin was in good agreement with the calculated C:H:N weight ratios (78.5:5.05:16.6). The UV-Vis spectra of $H_2T_{NH2}PP$ synthesized showed characteristic adsorption at 421, 514, 589, 650 nm (FIG. 7).

EXAMPLE 3

Incorporation of catalytic metal atom onto supporting chemical structure

Figure 8:
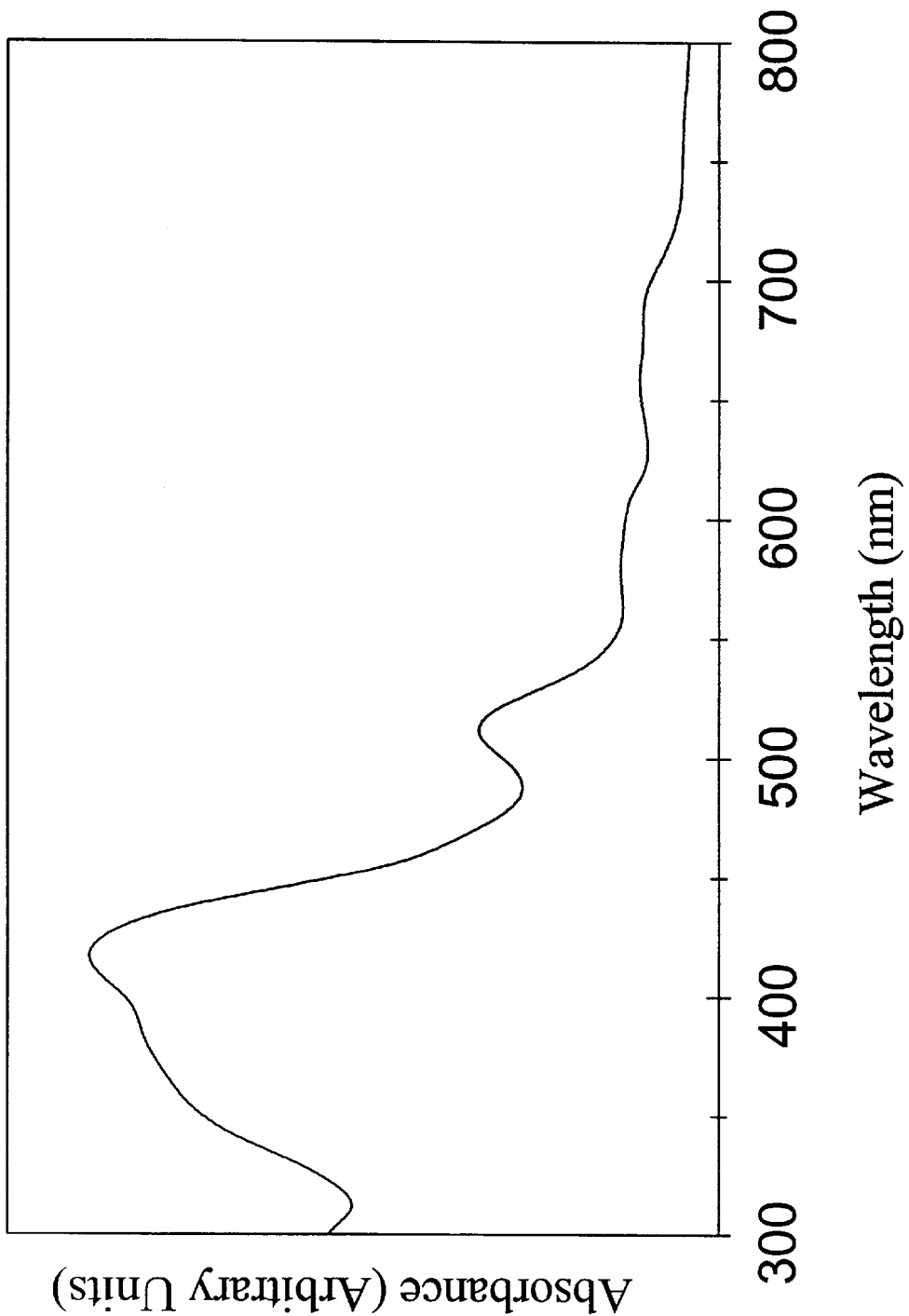
FIG. 8 is a UV-Vis spectrum of the porphyrin of FIG. 7 incorporating iron.

A catalytic metal atom capable of catalyzing an oxidation reaction of a reactant and an oxidant, specifically an iron atom, was incorporated into the $H_2T_{NH2}PP$ supporting chemical structure of Example 2. 1 g of $H_2T_{NH2}PP$ (1 g) and 1 g of anhydrous $FeBr_2$ were refluxed in 200 ml of dry tetrahydrofuran under nitrogen for 3 hours. The solvent was removed by a rotary evaporator and extracted by $CHCl_3$. The separated $CHCl_3$ layer was treated with 2 ml KOH and dried over anhydrous $Na_2SO_4$. The anhydrated solution was then reduced to 20 ml, and 10 ml of methanol and 3–4 drops of hydrobromic acid were added to it. Fine, black-purple amine-substituted iron porphyrin ($Fe(III)T_{NH2}PPBr$) was recovered by removal of the solvents at room temperature. The UV-Vis spectrum of the product showed broader bands at 421, 512, 600, and 660 nm (FIG. 8).

EXAMPLE 4

Preparation of heterogeneous oxidation catalysts: catalytic metal atoms covalently immobilized at Nb-doped porous solid phase surfaces via covalently-surface-bound metalloporphyrins Metal-doped porous solid-phase inorganic structures, specifically calcined Nb-doped mesoporous silica of Example 1, were mixed with the calculated amount of $Fe(III)T_{NH2}PPBr$ in 100 ml of chloroform and stirred for 24 hours at room temperature. The catalyst-loaded mesoporous support was washed thoroughly with $CHCl_3$ and dichloromethane ($CH_2Cl_2$) until colorless in the solution. The sample was then dried in vacuum oven at 100° C. The heterogeneous catalyst obtained is shown schematically in FIG. 1.

Figure 9:
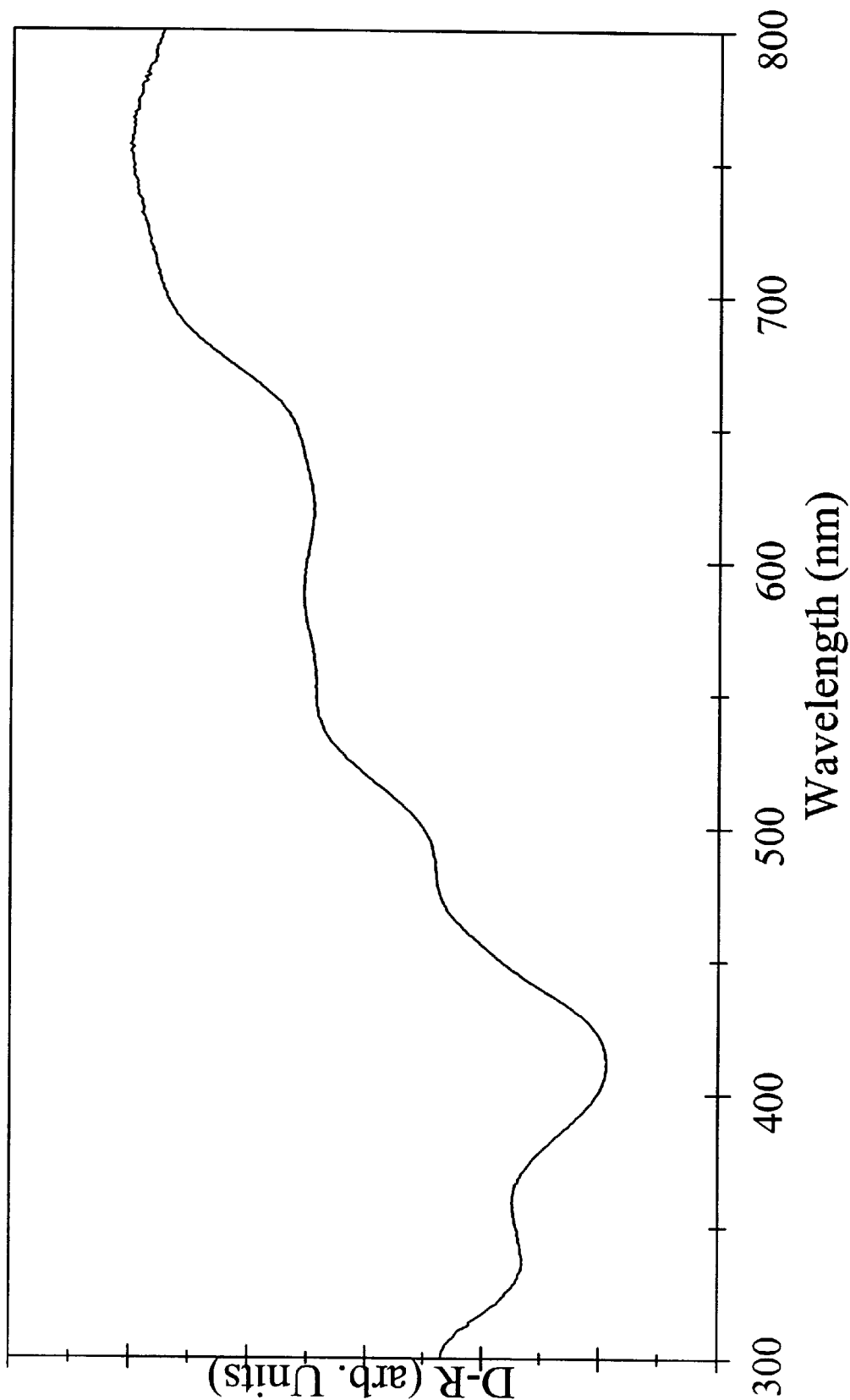
FIG. 9 is a UV-Vis diffuse reflectance spectrum of the iron porphyrin of FIG. 8 covalently immobilized on the Nb-doped siliceous mesoporous material of FIG. 5 via linkage free of any direct iron/surface covalent interaction.
Figure 10:
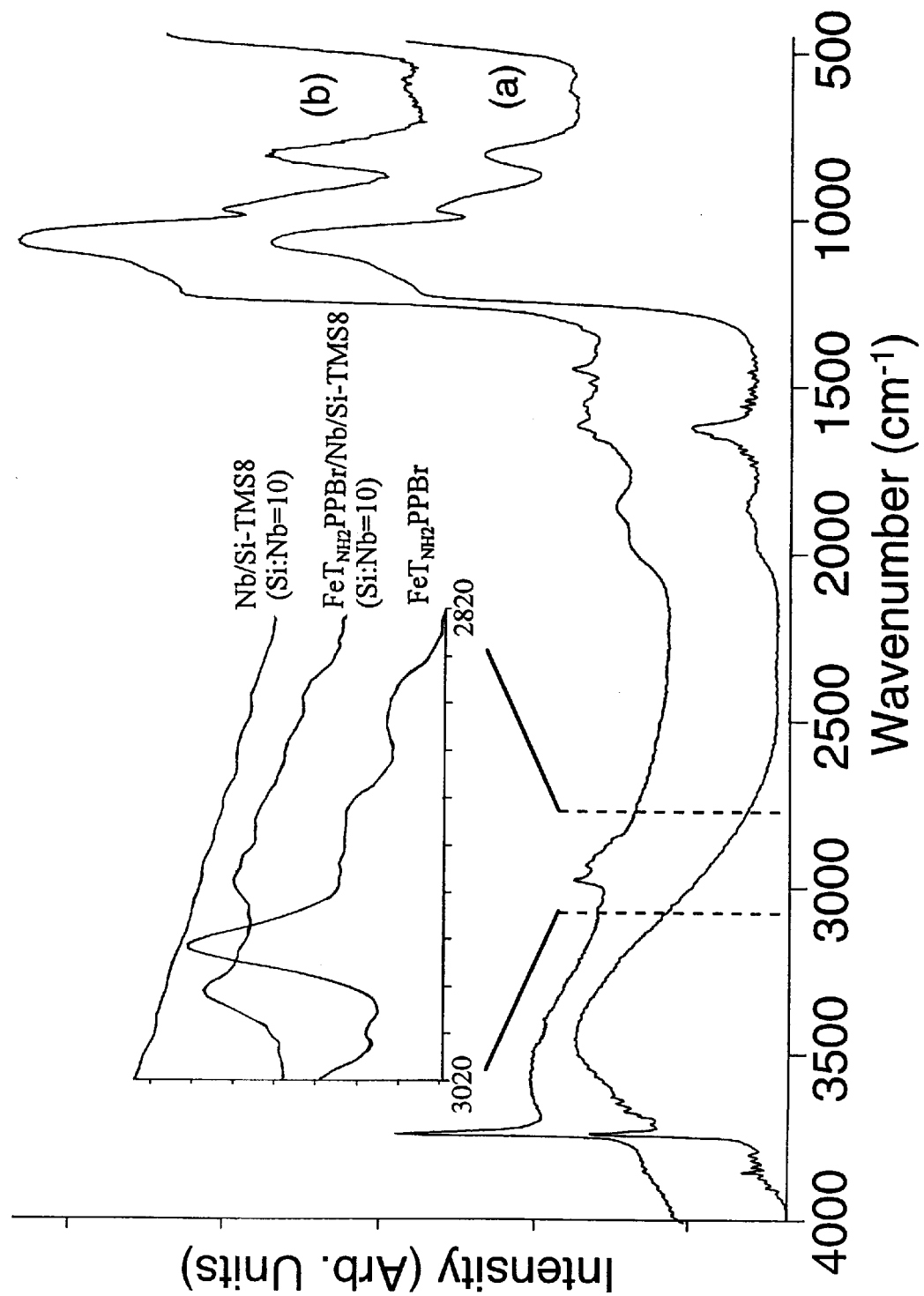
FIG. 10 shows PA-FTIR spectra of the Nb-doped siliceous mesoporous structure of FIGS. 4 and 5 (b) with and (a) without immobilized iron porphyrin of FIG. 8.
Figure 11:
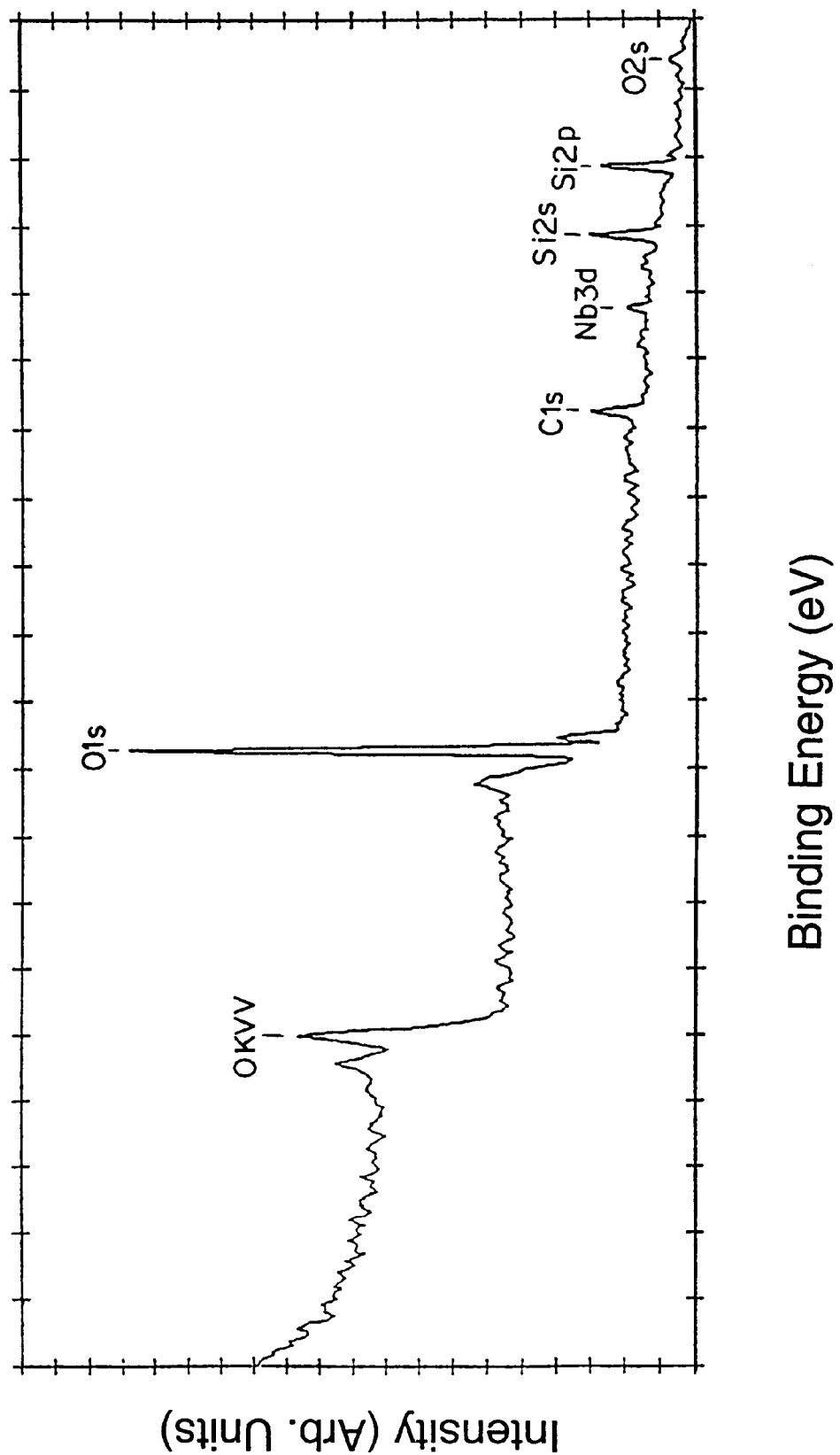
FIG. 11 is an XPS spectrum of the iron porphyrin of FIG. 8 covalently immobilized at the Nb-doped siliceous mesoporous structure of FIGS. 4 and 5.

Elemental analysis of the catalysts was obtained by direct current plasma emission spectroscopy (see Table 2). The results show that the iron porphyrin loading increases with increased Nb dopant concentration in the mesoporous matrix. A diffuse reflectance UV-Vis spectrum of the $Fe(III)T_{NH2}PPBr$ encapsulated within the $Nb—SiO_2$ support showed a broad Soret absorption band at 420 nm, indicating the immobilization of iron porphyrin in the mesoporous matrix (FIG. 9). The appearance of the Q band implies no distortion of the conjugated porphyrin plane due to the large pore dimension (see P. Rothemund, *J. Am. Chem. Soc.,* 2012 (1939)). Compared to the photoacoustic Fourier-transform infrared (PA-FTIR) spectrum of the unloaded Nb/Si-TMS8 (Si:Nb=10) matrix (FIG. 10, curve a), that with encapsulated Fe(III)T$_{NH2}$PPBr (FIG. 10, curve b) exhibited a group of additional peaks in the range of 2820–3020 cm$^{-1}$, which corresponds to the vibrations of the encapsulated porphyrins (FIG. 10). These peaks are slightly shifted in position from those of free porphyrin in solution indicating the presence of a strong interaction between the porphyrin molecules and the Nb/Si-TMS8. X-ray photoelectron spectroscopic (XPS) analysis of the supported catalyst detected no Fe atoms on the surface of the matrix (FIG. 11), confirming that the iron porphyrin molecules were located within the channels of the Nb-doped mesoporous SiO$_2$ and that the Fe atoms were free of direct covalent bonding to the surface. XRD patterns of the Fe(III)T$_{NH2}$PPBr/Nb/Si-TMS8 showed the hexagonal diffraction pattern of the mesoporous support without additional peaks associated with crystalline iron porphyrins, indicating that the iron complexes were highly-dispersed in the mesoporous matrix. A slight decrease in BET surface area of the porous matrix was noted after the loading of porphyrins into Nb/Si-TMS8.

TABLE 2

Elemental Analysis of the Fe(III)T$_{NH2}$PPBr/Nb/Si-TMS8

|  | Fe (wt %) | Nb (wt %) | Si (wt %) |
| --- | --- | --- | --- |
| Si:Nb = 10 | 0.75 | 7.72 | 42.8 |
| Si:Nb = 20 | 0.36 | 3.64 | 43.1 |

EXAMPLE 5

Epoxidation of olefins and hydroxylation of alkanes using covalently-surface-immobilized catalytic metal atom free of direct covalent bonding to the surface The heterogeneous metalloporphyrin catalysts of Example 4 were subjected to both epoxidation of olefins and hydroxylation of alkanes.

In an epoxidation reaction, 1 ml of cyclohexene was dissolved in 4 ml of CH$_2$Cl$_2$ in a 10 ml batch reactor. 100 mg of heterogeneous catalyst was then added to the solution. The catalytic reaction was initiated by the addition of 0.5 mmol of iodosobenzene oxidant at ambient conditions.

In a hydroxylation reaction, 30% of cyclohexane in 10 ml of CH$_2$Cl$_2$ was added into a 25 ml microreactor flask containing 100 mg supported metalloporphyrin catalyst. Then 0.5 mmol of iodosobenzene was added with stirring at ambient conditions.

In both oxidation reactions, the reaction progress was monitored at regular time intervals by gas chromatography with 10 µl of chlorobenzene as internal standard. A blank run without addition of catalyst was examined. The catalytic results were calculated based on the iodosobenzene charged, the full conversion of which was analyzed by introducing 2 ml of 10% sodium bisulfite solution to the blank run. The corresponding homogeneous reaction was performed at an identical condition.

Figure 12:
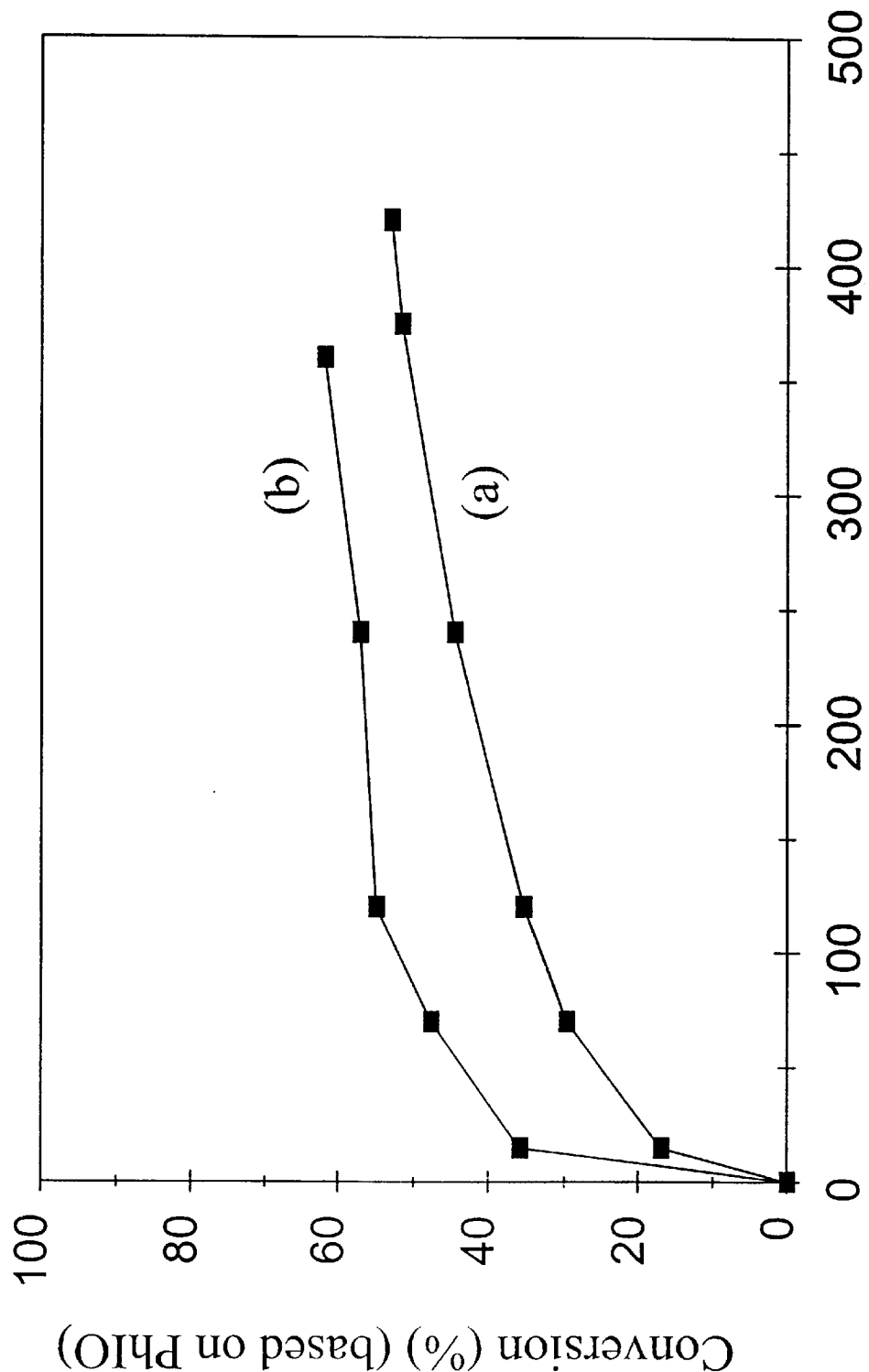
FIG. 12 plots conversion of cyclohexane hydroxylation over (a) the surface-immobilized catalyst of FIG. 11 and (b) unsupported iron porphyrin of FIG. 8.
Figure 13:
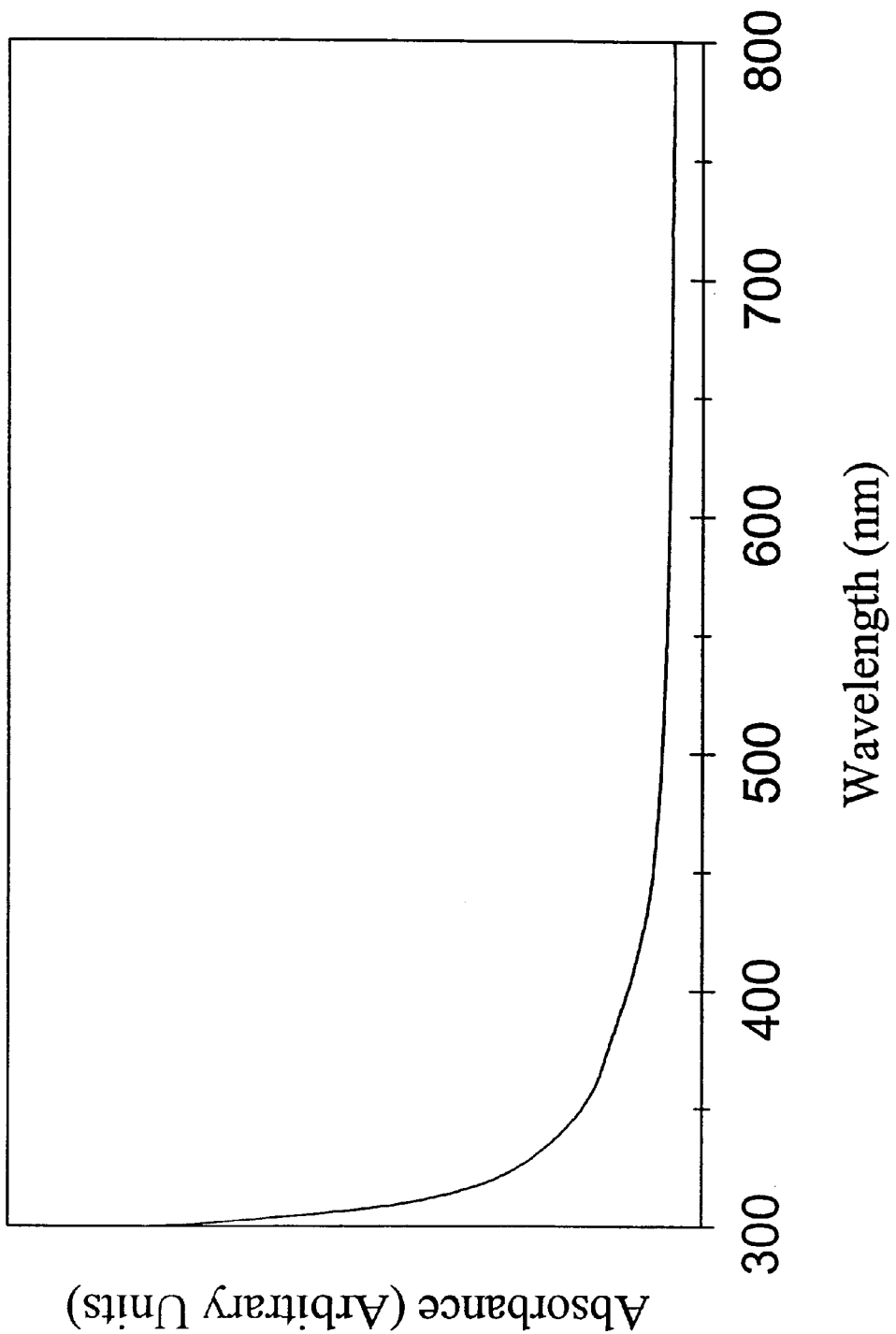
FIG. 13 is a UV-Vis spectrum of the product of the reaction of cyclohexane hydroxylation of FIG. 12(a)

In hydroxylation of the cyclohexane over Fe(III) T$_{NH2}$PPBr/Nb/Si-TMS8 (Si:Nb=10), a conversion of 53% exclusively to cyclohexanol was obtained after 6 hours (FIG. 12). The heterogeneous reaction initially took place at a slower rate than the homogeneous reaction but, at longer reaction times, conversion was comparable. The total conversion was higher than that reported for iron phthalocyanine in zeolite system (Herron, *J. Coord. Chem.*, 19, 25 (1988)), due to the much larger pore opening of the mesoporous support, which provides sufficient room for hosting the porphyrin catalyst without distortion of the macrocycle plane and allows for easy diffusion of both reactants and products. During the course of the reaction, no catalyst leaching was detected by UV-Vis spectroscopy; the UV-Vis spectrum of the reaction mixture (FIG. 13) did not show the 400–500 nm Soret band of Fe(III)T$_{NH2}$PPBr and was similar to that of CH$_2$Cl$_2$ solvent. No leaching of the catalyst was detected during the course of the reaction, indicating that the strong interaction established between the catalyst and matrix through the formation of Nb-N covalent bonds provides an excellent catalyst fixation mechanism.

Figure 14:
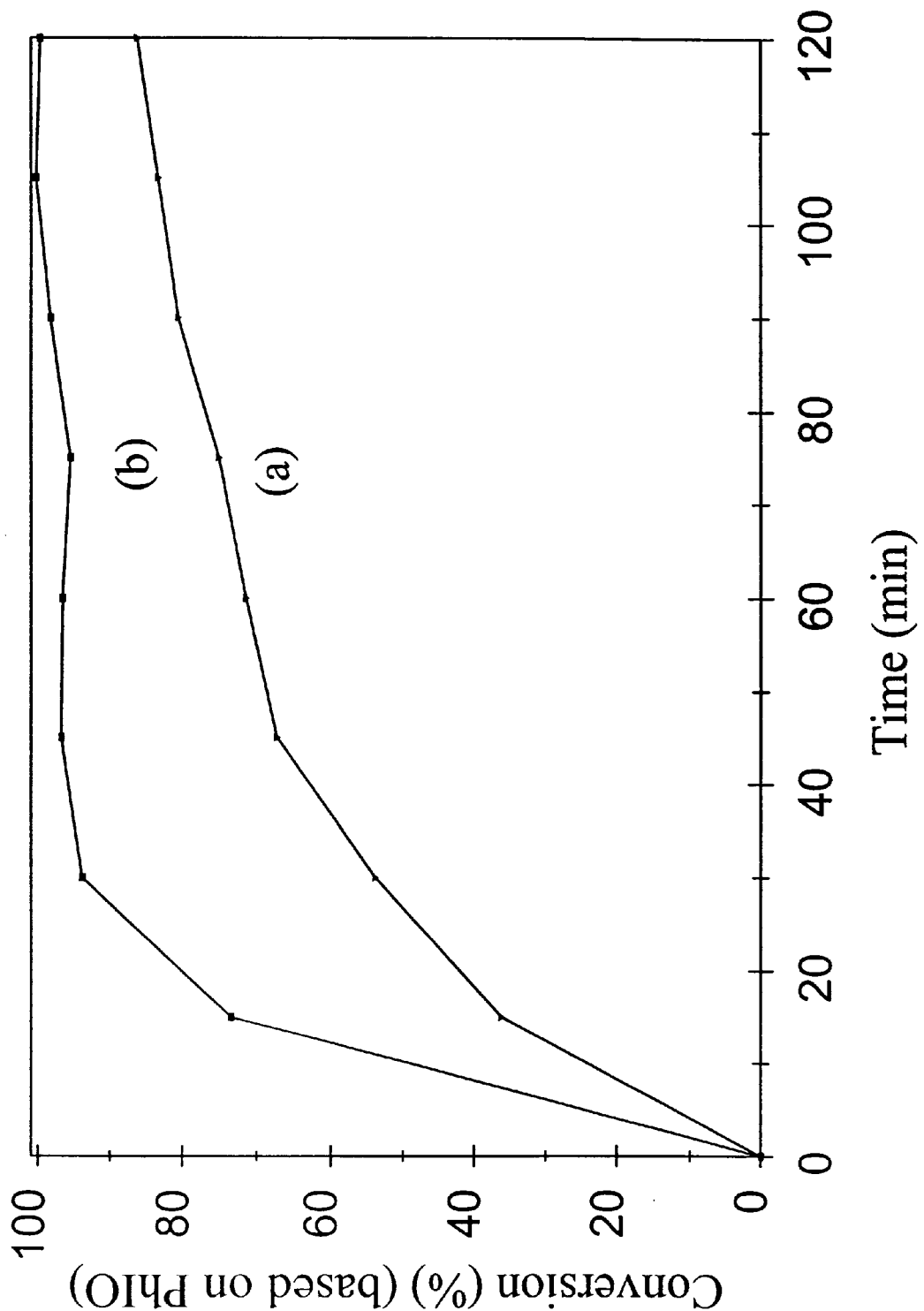
FIG. 14 plots overall conversion of cyclohexene epoxidation over (a) the surface-immobilized catalyst of FIG. 11 and (b) unsupported catalyst of FIG. 8.

Epoxidation of cyclohexene and cyclooctene were examined over Fe(III)T$_{NH2}$PPBr/Nb/Si-TMS8 (Si:Nb=10). The two reactions showed significantly different reaction rates and product selectivities. In the epoxidation of cyclohexene, a total conversion of 86% was obtained after 2 hours with cyclohexene oxide as the major product (FIG. 14, curve a). Compared to the homogeneous catalyst (FIG. 14, curve b), the heterogeneous catalyst showed a slower initial rate and slightly lower overall conversion.

Figure 15:
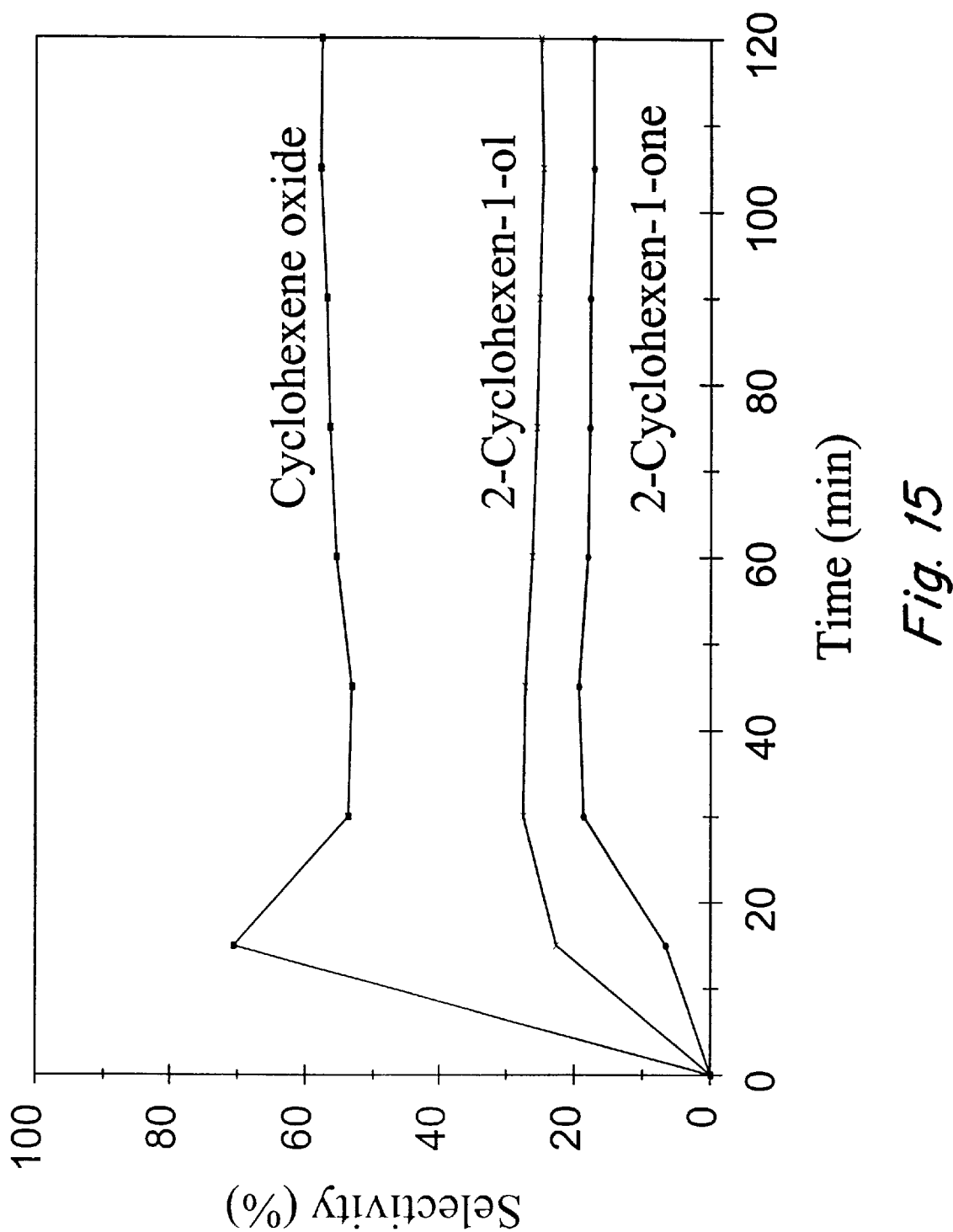
FIG. 15 plots product selectivity of cyclohexene epoxidation over the surface-immobilized catalyst of FIG. 11.

The product selectivities in the epoxidation of cyclohexene are shown in FIG. 15. In addition cyclohexene oxide, 2-cyclohexen-1-ol and 2-cyclohexen-1-one were produced via allylic oxidation. A mechanism of the allylic oxidation proposed by Groves et al. suggested that an auto-oxidation was initiated by dioxygen resulting in cyclohexenyl peroxyl radicals (*J. Am. Chem. Soc.*, 106, 2177 (1984)). A similar allylic oxidation has also been reported in polymer supported iron-porphyrin catalyst with 2-cyclohexen-1-one as the main product (Leanord, et al., *J. Chem. Soc., Perkin Trans.*, 2, 1917 (1990)). In the present case, however, the formation of cyclohexene oxide dominated the reaction. This may be attributed to the large pore volume in the mesoporous matrix that facilitates the formation and diffusion of cyclohexene oxide molecules without further oxidation.

In order to better understand the epoxidation performance of this system cyclooctene, which is less prone to auto-oxidation, was also studied as reactant. It was found that the conversion of cyclooctene increased with an increase in the Nb dopant concentration in the mesoporous support, which corresponds to an increase in the iron porphyrin loading. The total conversion of cyclooctene was very comparable to that of a polymer supported iron(III) tetraarylporphyrins (Cooke, et al., *J. Chem. Soc., Perkin Trans.*, 1, 1913 (1994)). However, unlike the polymer supported system, no leaching of the catalyst was observed in the present system. It was also observed that the catalytic activity increased with an increase in the surface area of the Nb-doped SiO$_2$. Deactivation of the catalyst was examined in repeat oxidation cycles. 30 mg of fresh oxidant was added to the reaction medium at the beginning of each 24 hour oxidation cycle. The oxidant conversion was 97% at the end of the first cycle, and subsequent cycles gave 100% oxidant conversions. No catalyst degradation was found after at least three oxidation cycles, illustrating that the present supported catalyst is unique in leaching resistance and reusability.

EXAMPLE 6

Synthesis of Al-doped porous solid phase structures

Al-doped mesoporous solid phase materials were synthesized from an inorganic siliceous precursor and an organic cationic trimethylammonium surfactant (C$_n$H2$_{n+1}$(CH$_3$)$_3$NBr) interaction., using 27% sodium silicate solution as the siliceous source, similar to the procedure of Example 1. 3.65 g of CTMABr was completely dissolved in H$_2$O. To this solution, 22.2 g of sodium silicate dispersed in 50 g water was slowly added at room temperature with vigorous stirring. The pH of the mixture was adjusted to 11.5 by diluted H$_2$SO$_4$. A dopant precursor, aluminum sulfate or aluminum isopropoxide, was gradually introduced into the silica loosely bounded and stirred for 30 min. The resulted gel mixture were continuously stirred for 3 hours at room temperature before they were aged in an oil bath at a temperature range of 100–150° C. In both cases, the molar composition of the final gel could be represented as 1 $SiO_2$:0.1 CTABr:120 $H_2O$:x $Al_2O_3$ (where x=0 to 0.2). The crystallized solid was washed with ethanol and water, filtered, and then calcined at 540° C. in air for 6 hours to remove organics. The samples obtained were designated as Al/Si-TMS9 (Si:Al=R), where R is given by the molar ratio of Si and Al.

Figure 16:
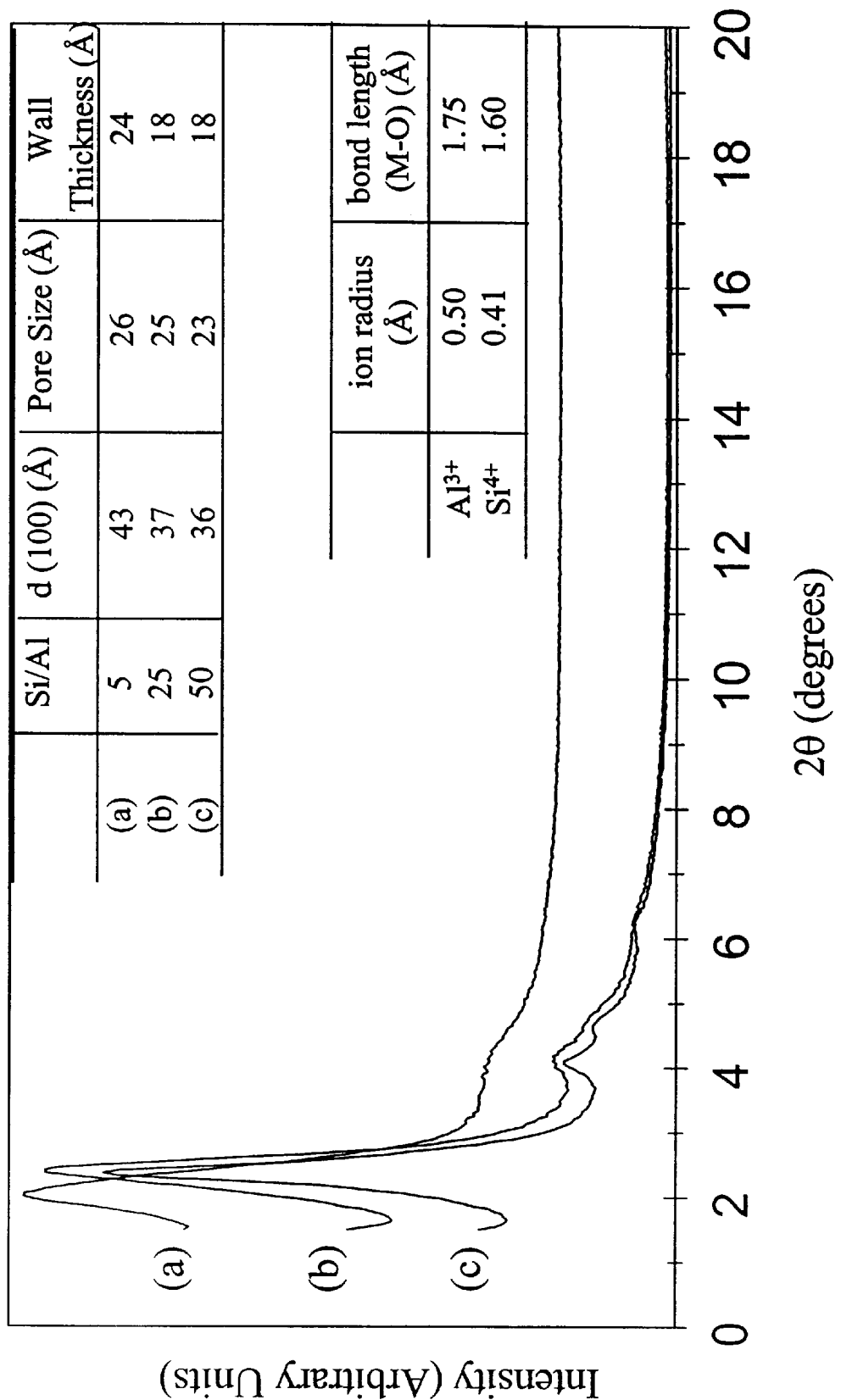
FIG. 16 is an XRD pattern of Al-doped siliceous mesoporous solid phase material.
Figure 17:
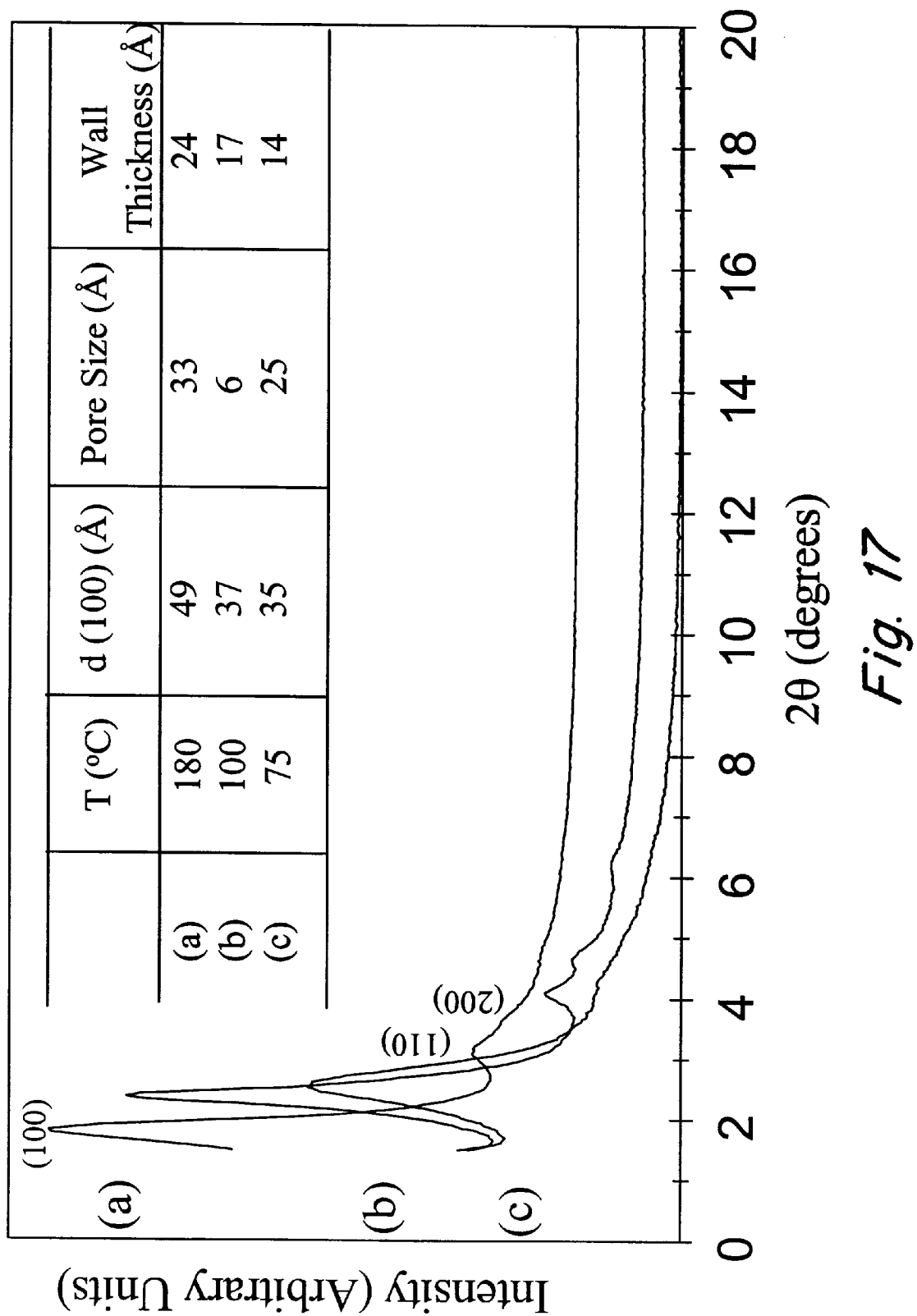
FIG. 17 shows XRD patterns of the Al-doped siliceous mesoporous structures differing in aging temperature.
Figure 18:
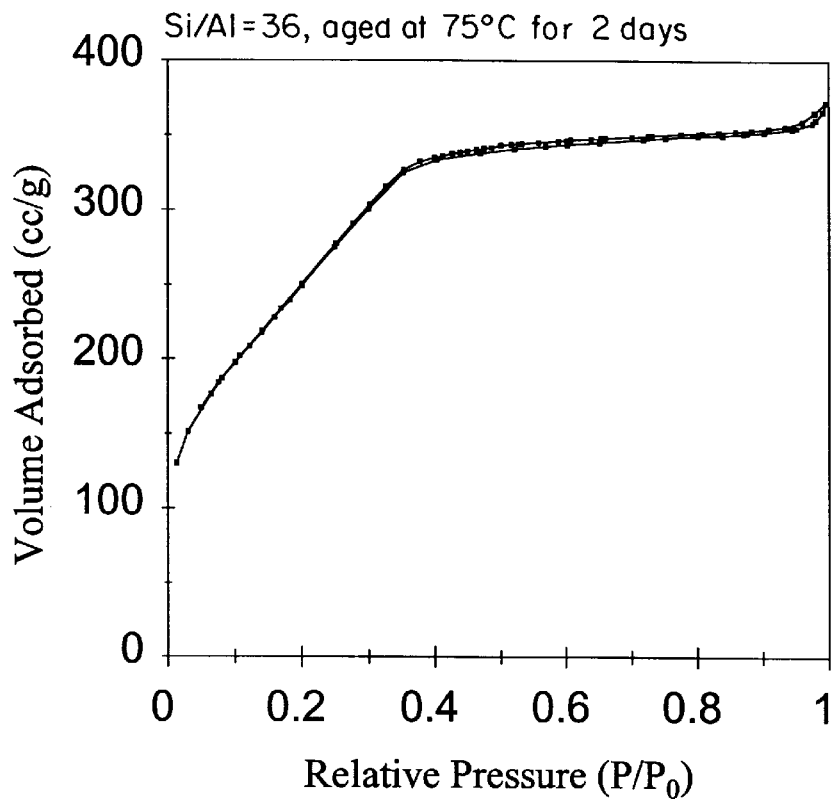
FIG. 18 is an $N_2$ adsorption-desorption isotherm of an Al-doped siliceous mesoporous structure.
Figure 19:
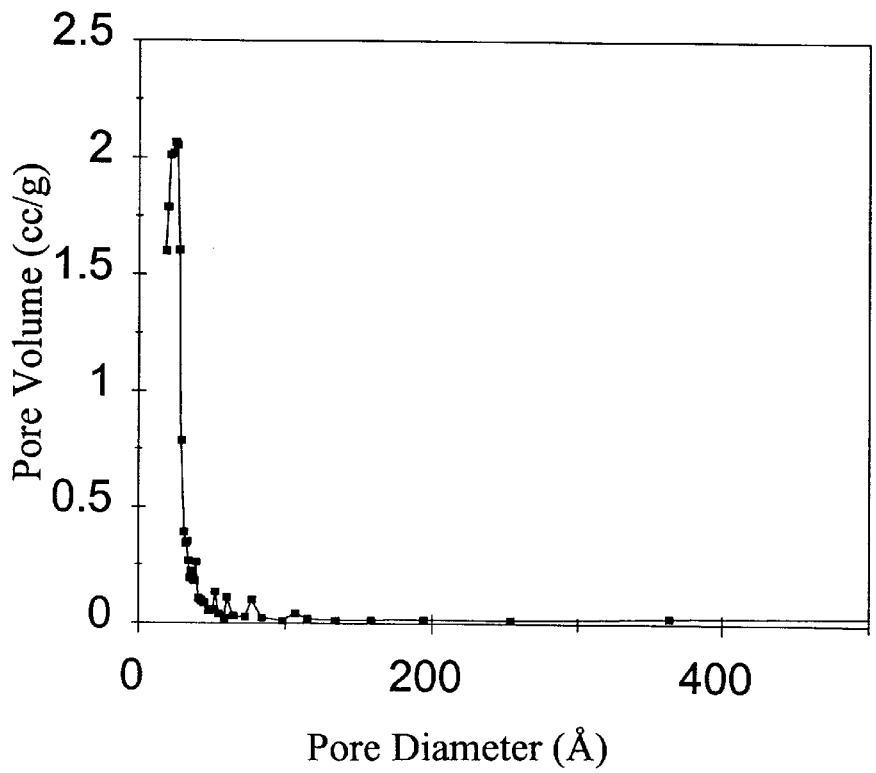
FIG. 19 shows BJH pore size distribution surface areas of Al-doped siliceous mesoporous structures.
Figure 20:
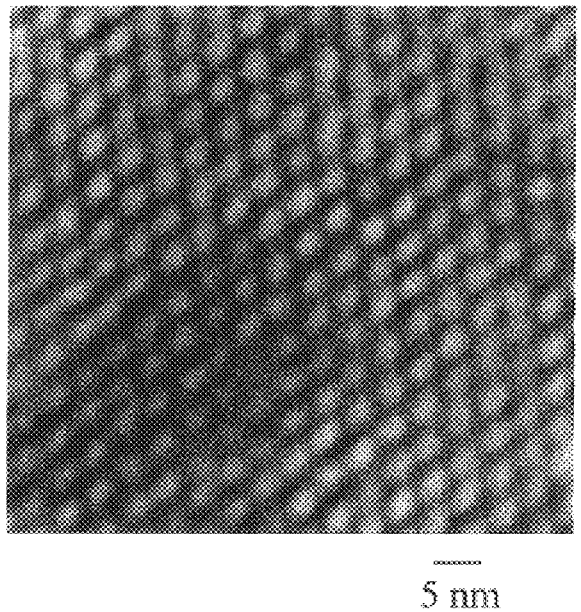
FIG. 20 is a photocopy of an TEM micrograph of an Al-doped siliceous mesoporous structure aged at 100° C. for two days.
Figure 21:
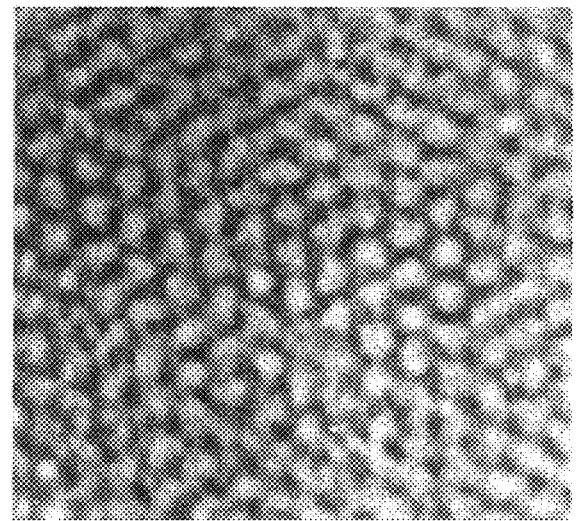
FIG. 21 is an TEM micrograph of an Al-doped siliceous mesoporous structure aged at 180° C. for two days.

The Al-doped mesoporous silica materials were characterized by X-ray diffractometry (XRD) and transmission electron microscopy (TEM). The XRD patterns of calcined Al/Si-TMS9, shown in FIG. 16, correspond to a typical hexagonal P6mm space group with the high-intensity (100) peak as well as three well-resolved peaks corresponding to (110), (200) and (210) diffractions, indicating that a high crystallinity was achieved using the synthesis approach. The unit cell parameters of the Al-doped $SiO_2$ were found to depend strongly on the aging temperature and the Al dopant concentration. It was shown that the d(100) spacing and crystallinity increased with the aging temperature (FIG. 17). At a given temperature, the unit cell parameter calculated by $a_0=2d(100)/\sqrt{3}$ is larger for Al/Si-TMS9 than for the undoped Si-TMS9 and increases with an increase in the Al-dopant concentration due to the larger ionic radius of $Al^{3+}$ (0.50 Å) and longer Al—O bond length (1.75 Å). The typical $N_2$ adsorption-desorption isotherm shown in FIG. 18 presents no hysteresis and corresponds to a narrow pore size distribution centered at 25 Å (FIG. 19). BET (Braunauer-Emmett-Teller) surface areas of the Al/Si-TMS9 samples were around 1000 $m^2$/g, depending on the dopant concentration. A summary of characteristics of the Al-$SiO_2$ material is listed in Table 3. TEM micrographs of Al/Si-TMS9 clearly show a hexagonally-packed pore array with averaged diameters of 25 Å and 35 Å for samples aged at 100° C. for two days (FIG. 20) and 180° C. for two days, respectively (FIG. 21).

TABLE 3

Characteristics of the mesoporous Al/Si-TMS9

| | $a_0$ Å | pore size Å | wall thickness (Å) | surface area ($m^2$/g) |
|---|---|---|---|---|
| Si:Al = 5 | 50 | 26 | 24 | 1143 |
| Si:Al = 25 | 43 | 25 | 18 | 1012 |
| Si:Al = 50 | 41 | 23 | 18 | 938 |

EXAMPLE 7

Preparation of heterogeneous oxidation catalysts: catalytic metal atoms chemically bonded to Al-doped interior surfaces of pores of uniform mesoporous structure Metal-doped porous solid-phase inorganic structures, specifically calcined Al-doped mesoporous silica of Example 6, were mixed with the calculated amount of iron phthalocyanine in 100 ml of acetone or dichloromethane and stirred for 24 hours at room temperature. The catalyst-loaded mesoporous support was washed thoroughly with acetone and dichloromethane ($CH_2Cl_2$) by Soxhlet extraction. The sample was then dried in vacuum oven at 120° C.

Figure 22:
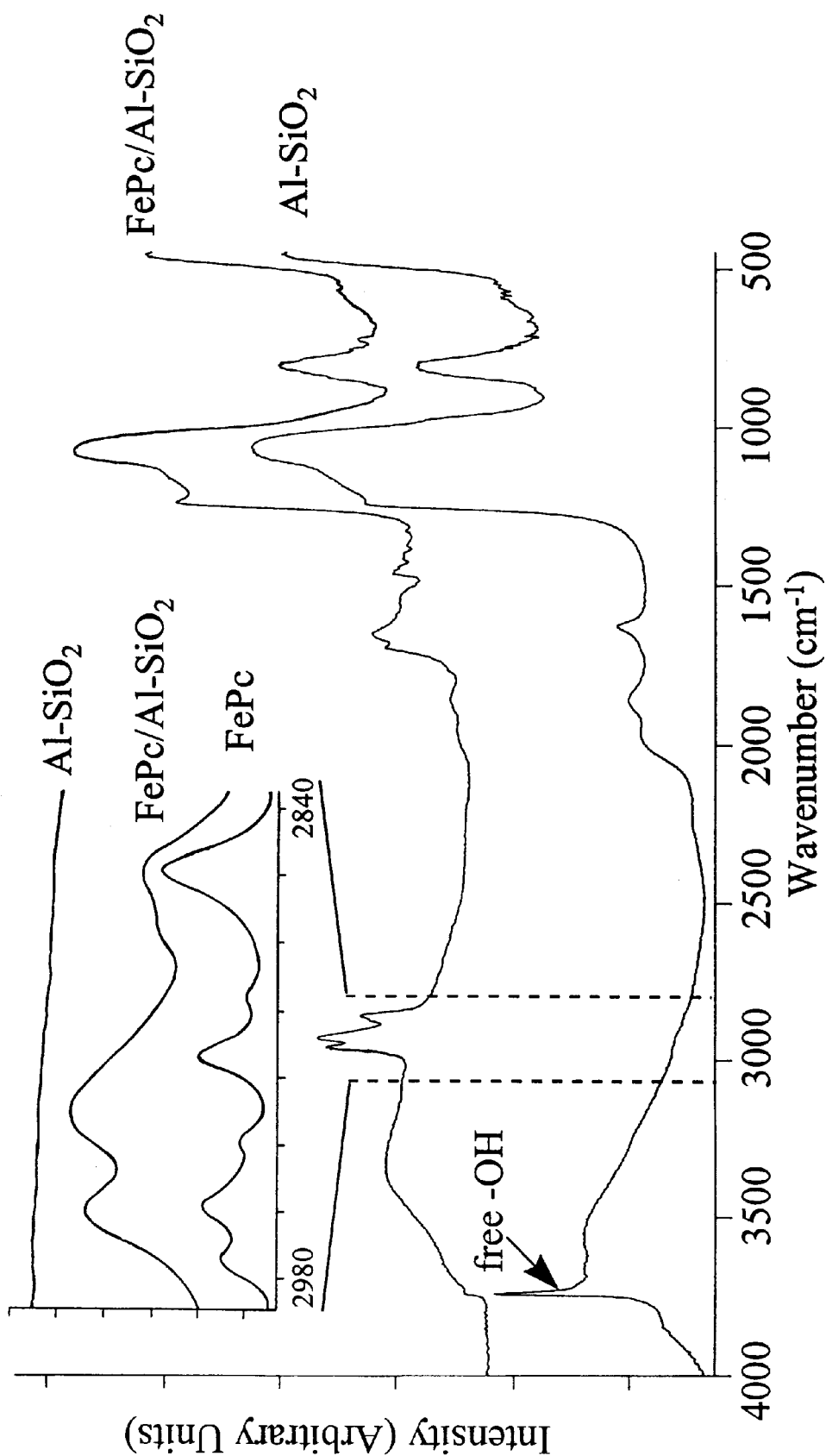
FIG. 22 shows PA-FTIR spectra of Al-doped siliceous mesoporous material alone, and with a surface-immobilized iron porphyrin oxidation catalyst including a catalytic metal atom chemically immobilized via surface OH groups.

Compared to the photoacoustic Fourier-transform infrared (PA-FTIR) spectrum of the unloaded Al/Si-TMS9 (Si:Al=25) matrix, that with encapsulated FePc exhibited a group of additional peaks in the range of 2820–3020 $cm^{-1}$, which corresponds to the vibrations of the encapsulated porphyrins (FIG. 22). These peaks are slightly shifted in position from those of free porphyrin in solution, indicating the confinement of the porphyrin molecules in the pore structure of Al/Si-TMS9. A significant decrease of the intensity of free M-OH groups indicates that chemical bonding in the form of strong interaction is present between the catalytic metal atom, the Fe center of the porphyrin structure, and the interior surface of the mesoporous Al/Si-TMS9 structure.

EXAMPLE 8

Epoxidation of olefins and hydroxylation of alkanes using heterogeneous oxidation catalysts of catalytic metal atoms chemically bonded to Al-doped interior surfaces of pores of uniform mesoporous structure The heterogeneous metalloporphyrin catalysts of Example 7 were subjected to both epoxidation of olefins and hydroxylation of alkanes.

In an epoxidation reaction, 1 ml of cyclohexene was dissolved in 4 ml of $CH_2Cl_2$ in a 10 ml batch reactor. 100 mg of heterogeneous catalyst was then added to the solution. The catalytic reaction was initiated by the addition of 0.5 mmol of iodosobenzene oxidant at ambient conditions. In a hydroxylation reaction, 30% of cyclohexane in 10 ml of $CH_2Cl_2$ was added into a 25 ml microreactor flask containing 100 mg supported metalloporphyrin catalyst. Then 0.5 mmol of iodosobenzene was added with stirring at ambient conditions. In both types of oxidation, the reaction progress was monitored at regular time intervals by gas chromatography with 10 µl of chlorobenzene as internal standard. A blank run without addition of catalyst was examined. The catalytic results were calculated based on the iodosobenzene charged, the full conversion of which was analyzed by introducing 2 ml of 10% sodium bisulfite solution to the blank run. The corresponding homogeneous reaction was performed at an identical condition.

In the hydroxylation of cyclohexane over FePC/Al/Si-TMS9 (Si:Al=25), a conversion of 58% exclusively to cyclohexanol was obtained after 2 hours. The conversion was comparable to that achieved by the homogeneous catalyst, and higher than that reported for iron phthalocyanine in zeolite system (N. Herron, *J. Coord. Chem.,* 19, 25, (1988)), probably due to the much larger pore opening of the mesoporous support, which provides sufficient room for hosting the porphyrin catalyst without distortion of the macrocycle plane and allows for easy diffusion of both reactants and products. The catalyst leaching is substantially reduced during the heterogeneous catalytic reaction.

Figure 23:
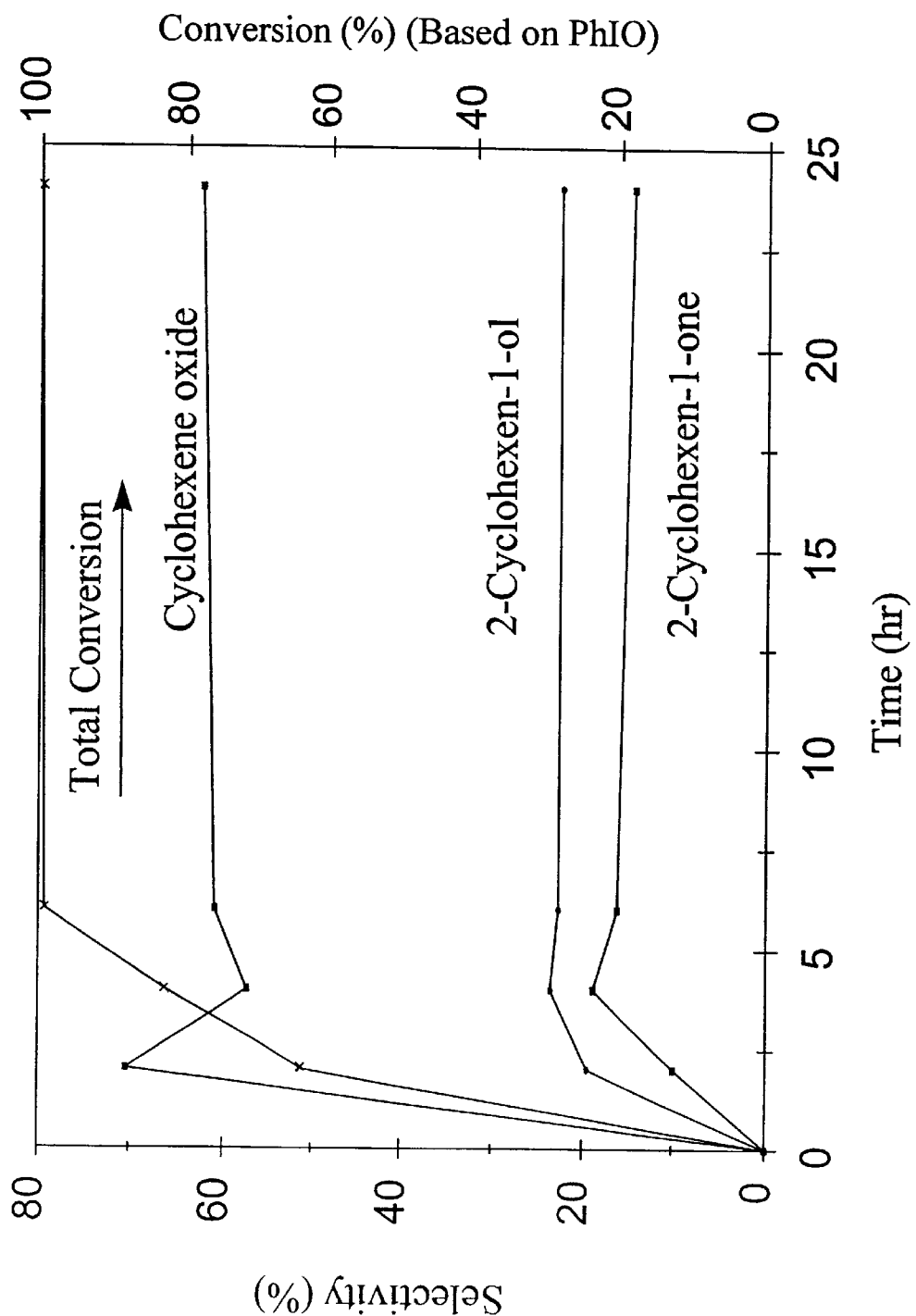
FIG. 23 plots product conversion of the epoxidation of cyclohexene over the surface-immobilized catalyst of FIG. 22.

Epoxidation of cyclohexene was examined over FePC/Al/Si-TMS9 (Si:Al=25). A total conversion of 64% of oxidant was obtained after 2 hours with cyclohexene oxide as the major product (FIG. 23). In addition to cyclohexene oxide, 2-cyclohexen-1-ol and 2-cyclohexen-1-one were produced via allylic oxidation. A mechanism of the allylic oxidation proposed by Groves et al. suggested that an auto-oxidation was initiated by dioxygen resulting in cyclohexenyl peroxyl radicals (Groves, et al., *J. Am. Chem. Soc.,* 106, 2177, (1984)). A similar allylic oxidation has also been reported in polymer supported iron-porphyrin catalyst with 2-cyclohexen-1-one as the main product (Leanord, et al., *J. Chem. Soc., Perkin Trans.,* 2, 1917, (1990)). In the present case, however, the formation of cyclohexene oxide dominated the reaction. This may be attributed to the large pore volume in the mesoporous matrix that facilitates the formation and diffusion of cyclohexene oxide molecules without further oxidation.

In summary, improved catalytic performance was achieved with the immobilized FePc encapsulated in the Al-doped SiO$_2$. Robust anchoring of the iron porphyrins onto the Al-doped pore walls of hexagonally-packed mesoporous SiO$_2$ was attained via an interaction between the metal center of the catalyst and free M-OH groups on the support. In addition, the Al dopants create extra charges on the pore structure and help to stabilize the FePC on the support. The fixation mechanism is different from the Coulombic forces and hydrogen bonding interaction involved in the conventional supported systems. It reduces leaching of the porphyrin during catalytic reactions. The well-defined spacious mesoporous channels further allow for free diffusion of reactants and products. By manipulating the structural characteristics, such as the surface area, pore size, nature of the dopant and dopant concentration of the support material, and the functional groups of the iron porphyrin, the catalytic behavior can be controlled systematically via synthesis parameters.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A catalyst comprising:
   an article having an inorganic surface, the surface including an oxide of a transition metal; and
   a porphyrin including a catalytic metal atom capable of catalyzing an oxidation reaction of a reactant and an oxidant provided to the catalytic metal atom, the porphyrin being covalently bonded, via —NH$_2$ groups, to the surface, the metal atom being free of direct covalent bonding to the surface.

2. A catalyst as in claim 1, wherein the transition metal is Ta or Nb.

3. A catalyst as in claim 2, wherein the transition metal is Nb.

4. A catalyst as in claim 3, wherein the Nb is present in the article in an amount of no more than about 20 mol %.

5. A catalyst as in claim 1, wherein the article is a porous inorganic article.

6. A catalyst as in claim 1, wherein the article is a regular array of hexagonally-packed or cubic-packed inorganic material.

7. A catalyst as in claim 1, wherein the catalytic metal atom is selected from the group consisting of Fe, Mn, Cr, Ni, Co, Ru, and Os.

8. A catalyst as in claim 1, wherein the article having an inorganic surface comprises
   a solid phase structure including pores defining an average pore diameter, at least 90% of which pores have a diameter that differs from the average pore diameter by no more than about 200%.

9. A catalyst as in claim 8, wherein the solid phase structure is dimensionally stable above 100° C.

10. A catalyst as in claim 9, wherein the solid phase structure is a porous inorganic article.

11. A catalyst as in claim 10, wherein the solid phase structure is a regular inorganic packed array.

12. A catalyst as in claim 11, wherein the solid phase structure is a regular array of hexagonally-packed or cubic-packed inorganic material.

13. A catalyst as in claim 9, wherein at least 90% of the pores have a diameter that differs from the average pore diameter by not more than about 100%.

14. A catalyst as in claim 9, wherein at least 90% of the pores have a diameter that differs from the average pore diameter by not more than about 25%.

15. A catalyst as in claim 14, wherein the transition metal is a Nb or Ta atom.

16. A catalyst as in claim 9, wherein the solid phase structure includes a plurality of essentially tubular pores having a length to diameter ratio of at least 10:1.

17. A catalyst as in claim 16, wherein the cross section of the plurality of essentially tubular pores does not vary by more than about 100% along the length of the pores.

18. A catalyst as in claim 9, wherein the solid phase structure includes pores having a mean diameter of at least about 5 Å.

19. A catalyst as in claim 9, wherein the surface is a regular array of hexagonally-packed or cubic-packed silica or alumina including Ta or Nb as a dopant present in the structure in an amount of no more than about 25 mol %.

20. A catalyst as in claim 8, wherein the solid phase structure does not swell in organic solvents.

21. A catalyst as in claim 1, wherein the inorganic surface is niobium oxide.

22. A catalyst comprising:
   an article having an inorganic surface, the surface including an oxide of a transition metal; and
   a porphyrin including a catalytic metal atom capable of catalyzing an oxidation reaction of a reactant and an oxidant provided to the catalytic metal atom, the porphyrin being covalently bonded to the surface via organic groups having a pair of unshared electrons forming a covalent bond to the surface.

23. A catalyst as in claim 21, wherein the transition metal is Ta or Nb.

24. A catalyst as in claim 22, wherein the transition metal is present in an amount of no more than about 20 mol %.

25. A catalyst as in claim 23, wherein the inorganic surface is niobium oxide.

* * * * *